United States Patent
Toma et al.

(10) Patent No.: US 11,380,005 B2
(45) Date of Patent: Jul. 5, 2022

(54) METHODS, SYSTEMS AND APPARATUS TO OPTIMIZE PIPELINE EXECUTION

(71) Applicant: Movidius LTD., Dublin (IE)

(72) Inventors: Vasile Toma, Timisoara (RO); Richard Richmond, Belfast (GB); Fergal Connor, Dundalk (IE); Brendan Barry, Dublin (IE)

(73) Assignee: Movidius Limited, Schiphol-Rijk (NL)

( * ) Notice: Subject to any disclaimer, the term of this patent is extended or adjusted under 35 U.S.C. 154(b) by 301 days.

(21) Appl. No.: 16/614,737

(22) PCT Filed: May 18, 2018

(86) PCT No.: PCT/EP2018/063229
§ 371 (c)(1),
(2) Date: Nov. 18, 2019

(87) PCT Pub. No.: WO2018/211127
PCT Pub. Date: Nov. 22, 2018

(65) Prior Publication Data
US 2020/0226776 A1 Jul. 16, 2020

Related U.S. Application Data

(60) Provisional application No. 62/508,891, filed on May 19, 2017.

(51) Int. Cl.
*G06T 7/593* (2017.01)
*G06T 7/77* (2017.01)
(Continued)

(52) U.S. Cl.
CPC ............... *G06T 7/593* (2017.01); *G06T 7/77* (2017.01); *H04N 13/128* (2018.05); *G06T 2200/28* (2013.01); *G06T 2207/20228* (2013.01)

(58) Field of Classification Search
USPC .......................................... 382/154
See application file for complete search history.

(56) References Cited

U.S. PATENT DOCUMENTS 10,554,947 B1 * 2/2020 Li .................... H04N 13/128
10,764,561 B1 * 9/2020 Devitt ................ H04N 13/106
(Continued)

OTHER PUBLICATIONS

International Searching Authority, "Search Report," issued in connection with PCT patent application No. PCT/EP2018/063229 dated Aug. 16, 2018, 4 pages.
(Continued)

*Primary Examiner* — Kathleen Y Dulaney
(74) *Attorney, Agent, or Firm* — Hanley, Flight & Zimmerman, LLC

(57) ABSTRACT

Methods, apparatus, systems, and articles of manufacture to optimize pipeline execution are disclosed. An example apparatus includes a cost computation manager to determine a value associated with a first location of a first pixel of a first image and a second location of a second pixel of a second image by calculating a matching cost between the first location and the second location, and an aggregation generator to generate a disparity map including the value, and determine a minimum value based on the disparity map corresponding to a difference in horizontal coordinates between the first location and the second location.

27 Claims, 15 Drawing Sheets

(51) Int. Cl.
*H04N 13/128* (2018.01)
*G06K 9/00* (2022.01)

(56) References Cited

U.S. PATENT DOCUMENTS

| | | | | |
|---|---|---|---|---|
| 2004/0264763 | A1* | 12/2004 | Mas | G06V 10/147 |
| | | | | 382/154 |
| 2006/0120594 | A1* | 6/2006 | Kim | G06T 7/30 |
| | | | | 382/154 |
| 2010/0315510 | A1* | 12/2010 | Dunn | H04N 5/2723 |
| | | | | 348/157 |
| 2011/0050853 | A1* | 3/2011 | Zhang | H04N 13/261 |
| | | | | 348/44 |
| 2012/0308119 | A1* | 12/2012 | Ogata | G06T 7/593 |
| | | | | 382/154 |
| 2013/0083994 | A1* | 4/2013 | Ren | G06T 7/97 |
| | | | | 382/154 |
| 2013/0129148 | A1* | 5/2013 | Nanri | G01B 11/00 |
| | | | | 382/103 |
| 2013/0129194 | A1* | 5/2013 | Gusis | G06T 5/50 |
| | | | | 382/154 |
| 2014/0160247 | A1* | 6/2014 | Shi | H04N 13/239 |
| | | | | 348/47 |
| 2014/0205181 | A1* | 7/2014 | Woodfill | G06T 7/593 |
| | | | | 382/154 |
| 2014/0241637 | A1* | 8/2014 | Schreer | G06V 20/64 |
| | | | | 382/218 |
| 2015/0123973 | A1* | 5/2015 | Larsen | G06T 15/04 |
| | | | | 345/427 |
| 2015/0181195 | A1* | 6/2015 | Bruls | H04N 13/161 |
| | | | | 348/43 |
| 2015/0262365 | A1* | 9/2015 | Shimizu | H04N 13/204 |
| | | | | 382/103 |
| 2015/0271472 | A1* | 9/2015 | Liu | H04N 13/106 |
| | | | | 348/47 |
| 2016/0048970 | A1* | 2/2016 | Loghman | G06T 5/005 |
| | | | | 382/154 |
| 2017/0272723 | A1* | 9/2017 | Ren | G06T 7/85 |
| 2017/0374339 | A1* | 12/2017 | Lim | H04N 13/106 |
| 2018/0027224 | A1* | 1/2018 | Javidnia | G06V 10/44 |
| | | | | 382/154 |
| 2018/0082136 | A1* | 3/2018 | Sasamoto | G08G 1/16 |
| 2018/0130220 | A1* | 5/2018 | Goldentouch | G06T 1/20 |
| 2019/0213746 | A1* | 7/2019 | Azuma | G06V 10/751 |

OTHER PUBLICATIONS

International Searching Authority, "Written Opinion," issued in connection with PCT patent application No. PCT/EP2018/063229 dated Aug. 16, 2018, 7 pages.

Yi Shan et al., "Hardware Acceleration for an Accurate Stereo Vision System Using Mini-Census Adaptive Support Region," ACM Transactions on Embedded Computing Systems, vol. 13, No. 4s, Article 132 (Mar. 2014), 24 pages.

* cited by examiner

```
New_Cost_x = updatePathCost(ICB_x, PCB_x)
    // compute min cost of pixel 'x' over all disparities
    MIN_2 = compute_min(PCB_x)

// compute P1 and P2
    P1 = LookUp_table_P1[intesityDiff];
    P2 = LookUp_table_P2[intesityDiff];

// compute the new cost for each disparity
    foreach disparity 'd' from 0 to D-1
        MIN_1 = PCB_x[d]
        if (PCB_x[d-1] + P1 < MIN_1)
            MIN_1 = PCB_x[d-1] + P1
        if (PCB_x[d+1] + P1 < MIN_1)
            MIN_1 = PCB_x[d+1] + P1
        if (MIN_2 + P2 < MIN_1)
            MIN_1 = MIN_2 + P2
        New_Cost_x[d] = CLAMP(ICB_x[d] + MIN_1 - MIN_2, 255)
    return New_Cost_x
```

FIG. 9

```
foreach pixel 'x' in line
    foreach path 'n'
        PathCostNew[n][x] = updatePathCost(ICB[x], PCB[n][x])
    foreach disparity 'd' from 0 to D-1
        // sum cost for each path into aggregated cost
        // sum to 10 bits and clamp back to 8
        AGV[x][d] = clamp((PathCostNew[0][x][d] +
                    PathCostNew[1][x][d] +
                    PathCostNew[2][x][d])/div_factor, 255)
    // find disparity with minimum cost
    RB[x] = findMinimum(AGV[x])
    // Save temp buffer back
    foreach path 'n'
        PCB[n][x] = PathCostNew[n][x];
```

METHODS, SYSTEMS AND APPARATUS TO OPTIMIZE PIPELINE EXECUTION

RELATED APPLICATION

This patent arises from an application claiming the benefit of U.S. Provisional Patent Application Ser. No. 62/508,891, which was filed on May 19, 2017. U.S. Provisional Patent Application Ser. No. 62/508,891 is hereby incorporated herein by reference in its entirety. Priority to U.S. Provisional Patent Application Ser. No. 62/508,891 is hereby claimed.

FIELD OF THE DISCLOSURE

This disclosure relates generally to image processing and, more particularly, to methods, systems and apparatus to optimize pipeline execution.

BACKGROUND

In recent years, image processing applications have emerged on a greater number of devices. While image processing, such as facial recognition, object recognition, etc., has existed on desktop platforms, a recent increase in mobile device image processing features have emerged. Mobile devices tend to have a relatively less capable processor, memory capacity and power reserves when compared to desktop platforms.

BRIEF DESCRIPTION OF THE DRAWINGS

FIG. 9 depicts example computer readable instructions that may be executed to implement the example pipeline optimization system of FIG. 1 and/or the example SIPP accelerator of FIG. 7 to determine a disparity with a minimum cost associated with a first pixel in a first image and a second pixel in a second image.

FIG. 10 depicts example computer readable instructions that may be executed to implement the example pipeline optimization system of FIG. 1 and/or the example SIPP accelerator of FIG. 7 to determine a cost associated with a propagation path.

The figures are not to scale. In general, the same reference numbers will be used throughout the drawing(s) and accompanying written description to refer to the same or like parts.

DETAILED DESCRIPTION

Figure 1:
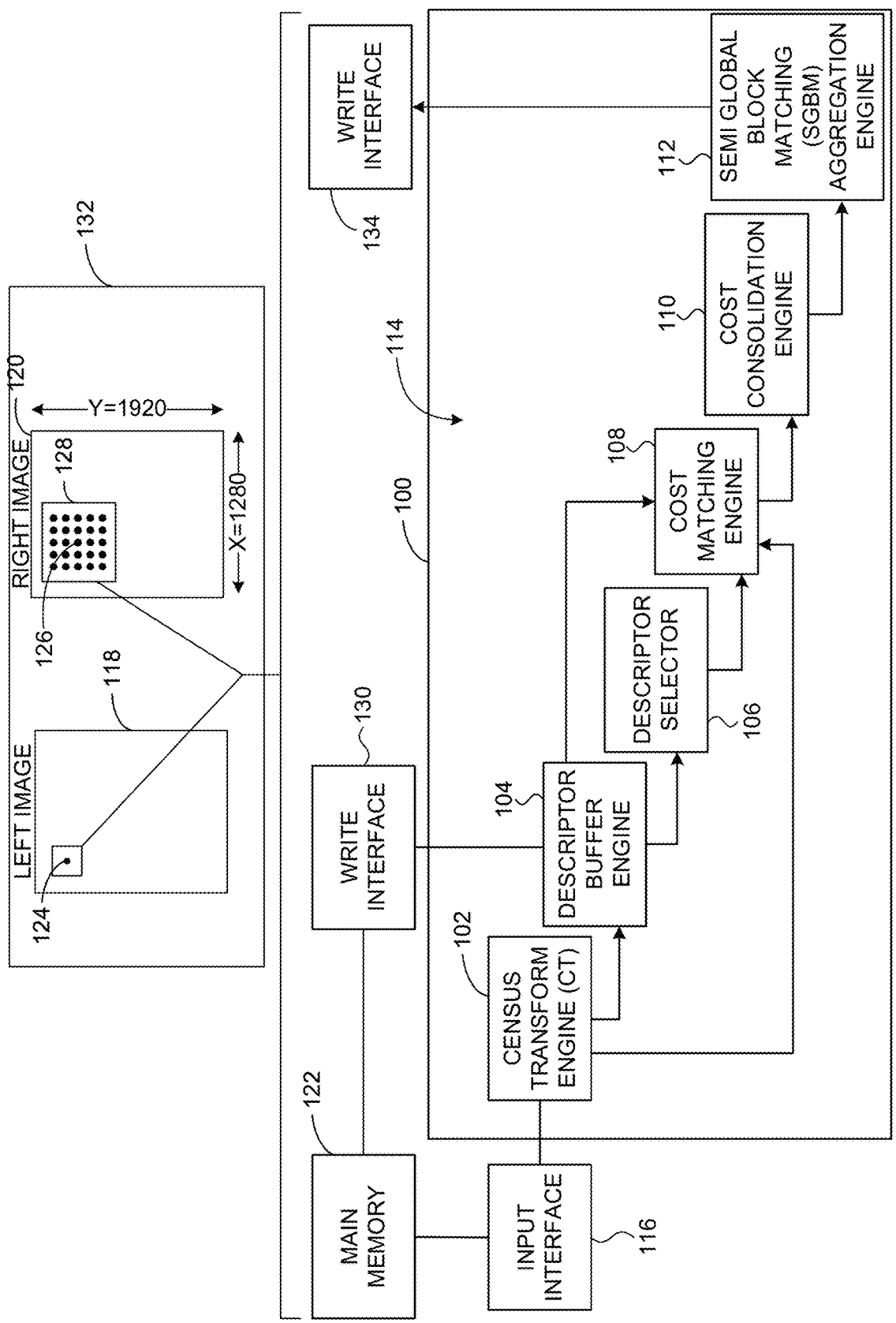
FIG. 1 is a schematic illustration of an example hardware architecture of an example pipeline optimization system constructed in accordance with the teachings of this disclosure.

Computational imaging is a new imaging paradigm capable of providing unprecedented user-experience and information based on images and videos. For example, computational imaging can process images and/or videos to provide a depth map of a scene, provide a panoramic view of a scene, extract faces from images and/or videos, extract text, features, and metadata from images and/or videos, and even provide automated visual awareness capabilities based on object and scene recognition features.

Computational imaging can transform the ways in which machines capture and interact with the physical world. For example, via computational imaging, machines can capture images that were extremely difficult to capture using traditional imaging techniques. As another example, via computational imaging, machines can understand and/or otherwise derive characteristics associated with their surroundings and react in accordance with their surroundings.

One of the challenges in bringing computational imaging to a mass market is that computational imaging is inherently computationally expensive. Computational imaging often uses substantial quantities of images at a high resolution and/or a substantial quantity of videos with a high frame rate. Therefore, computational imaging often needs the support of powerful computing platforms. Furthermore, because computational imaging is often used in mobile settings, for example, using a smart phone or a tablet computer, computational imaging often needs the support of powerful computing platforms that can operate at a low power budget.

Examples disclosed herein improve different types of image processing tasks that typically require a substantial amount of computational resource capabilities. Examples disclosed herein assist with stereo matching tasks, which refer to the process of taking two or more images and estimating a three-dimensional (3D) model of a scene by finding matching pixels in the two or more images, and converting the two-dimensional (2D) positions into 3D depths. Stated differently, stereo matching takes two (or more) 2D images to create one 3D image. Stereo imaging includes computations to determine how far an object might be from a corresponding capture device (e.g., a camera).

In some examples, the image data associated with an input image (e.g., a photograph, a video frame, etc.) is received and/or otherwise retrieved from two or more cameras (e.g., camera pairs, stereo camera pairs, etc.) and/or any number of multiple camera pairs. Examples disclosed herein facilitate a pipelined and flexible hardware architecture for accelerating stereo vision algorithms and, in some examples, two clock cycles per pixel are achieved. Such performance capabilities enable real-time processing of, for example, four camera pairs at 720p resolution at 30 Hz, two camera pairs at 720 resolution at 60 Hz, or eight camera pairs at a VGA resolution at 60 Hz. Examples disclosed herein support 8 and 10 pixel data, and have a configurable disparity search range of 64 or 96. Generally speaking, the search range is indicative of a metric corresponding to a supported depth range.

As used herein, the term "disparity" refers to a difference in coordinates (e.g., horizontal coordinates, vertical coordinates, etc.) of a first pixel in a first image and a second pixel in a second image of a stereo image pair. In some examples, the first pixel and the second pixel are identical pixels located in different images. A disparity value will be high for a nearer distance and will be low for a farther distance as disparity is inversely proportional to depth. The disparity of features (e.g., one or more pixels) between two stereo images are typically computed as a shift to the left of an image feature when viewed in the right image. For example, a single point that appears at an X-coordinate t (measured in pixels) in the left image may be present at the X-coordinate t−3 in the right image, where the disparity at the location in the right image is 3 pixels.

Examples disclosed herein enable a flexible architecture, in which any unit (e.g., a processing unit, a module, etc.) can be used and/or otherwise implemented individually, or in combination with one or more other hierarchical units, as described in further detail below. In some examples, particular operational units may be bypassed to increase a pipeline propagation efficiency, particularly when some of the input data may have been pre-processed by other engines.

Examples disclosed herein enable a flexible Census Transform (CT) Cost Function, which can also be used without one or more operational units of the architecture (e.g., a stand-alone basis). Examples disclosed herein enable a semi global block matching (SGBM) algorithm cost aggregation (e.g., SGBM3), and can operate on two or more plane images in two or more passes. Examples disclosed herein include grey-scale image input mode and/or input modes associated with precomputed costs. Examples disclosed herein include, but are not limited to, disparity output modes, disparity plus error output modes, best and second best disparity modes, and/or raw aggregation cost output modes.

FIG. 1 illustrates an example hardware architecture of an example pipeline optimization system 100. The example pipeline optimization system 100 represents one or more hardware accelerators corresponding to a pipelined and flexible hardware architecture for accelerating a stereo-vision algorithm or other image processing algorithm. The example pipeline optimization system 100 is a streaming image processing pipeline (SIPP) accelerator. For example, the pipeline optimization system 100 can be implemented entirely in hardware, software, or a combination thereof. However, in some examples, replacing one or more hardware components of the pipeline optimization system 100 with software or a software-based implementation can cause reduced performance. In the illustrated example of FIG. 1, the pipeline optimization system 100 includes an example census transform (CT) engine 102, an example descriptor buffer engine 104, an example descriptor selector 106, an example cost matching engine 108, an example cost consolidation engine 110, and an example SGBM aggregation engine 112. Together, the example CT engine 102, the example descriptor buffer engine 104, the example cost matching engine 108, the example cost consolidation engine 110, and the example SGBM aggregation engine 112 form an example pipeline 114, in which each component is sometimes referred to herein as a "stage" of the example pipeline 114.

Figure 2A:
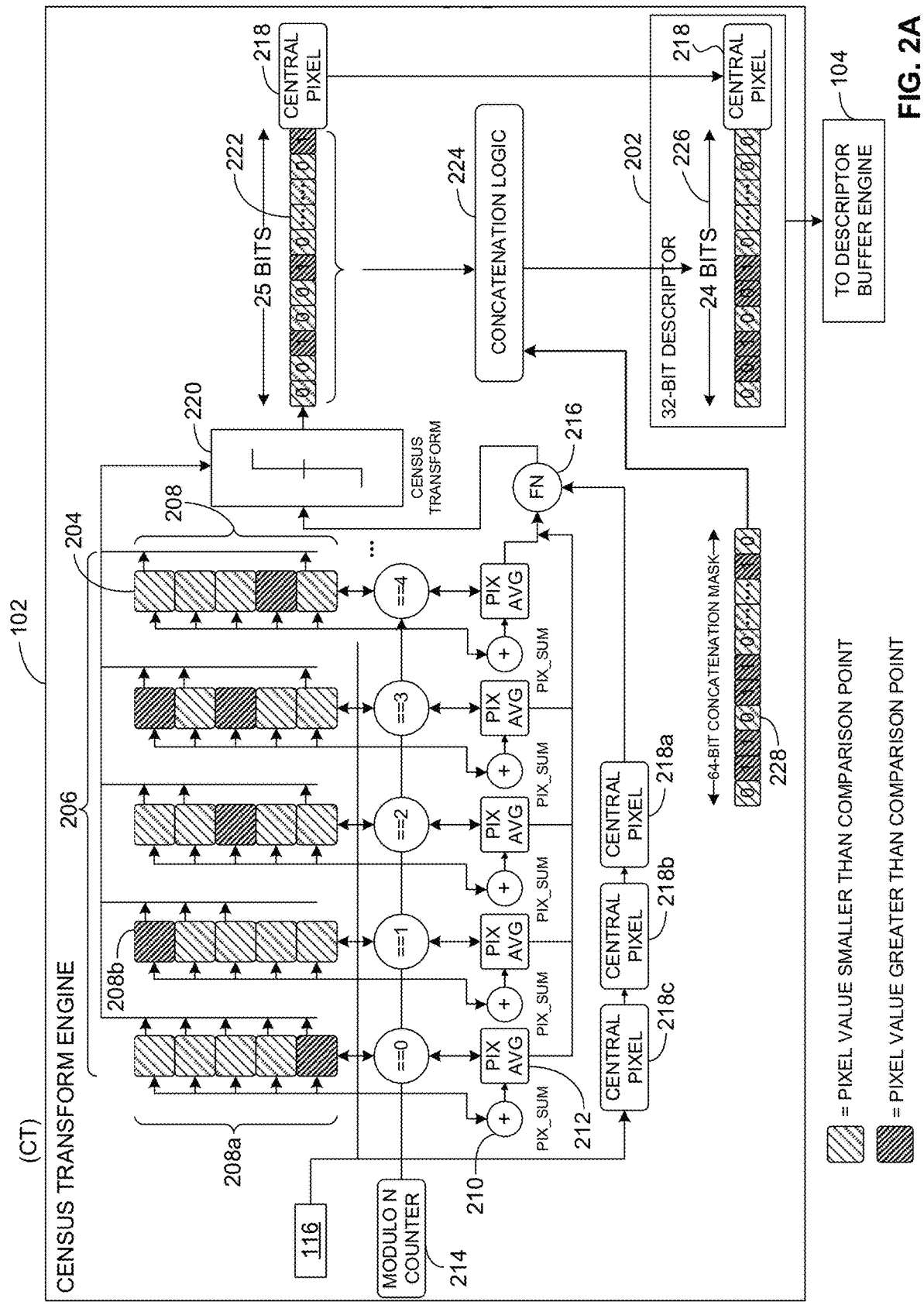
FIG. 2A is a schematic illustration of an example census transform engine of the example pipeline optimization system of FIG. 1.
Figure 2B:
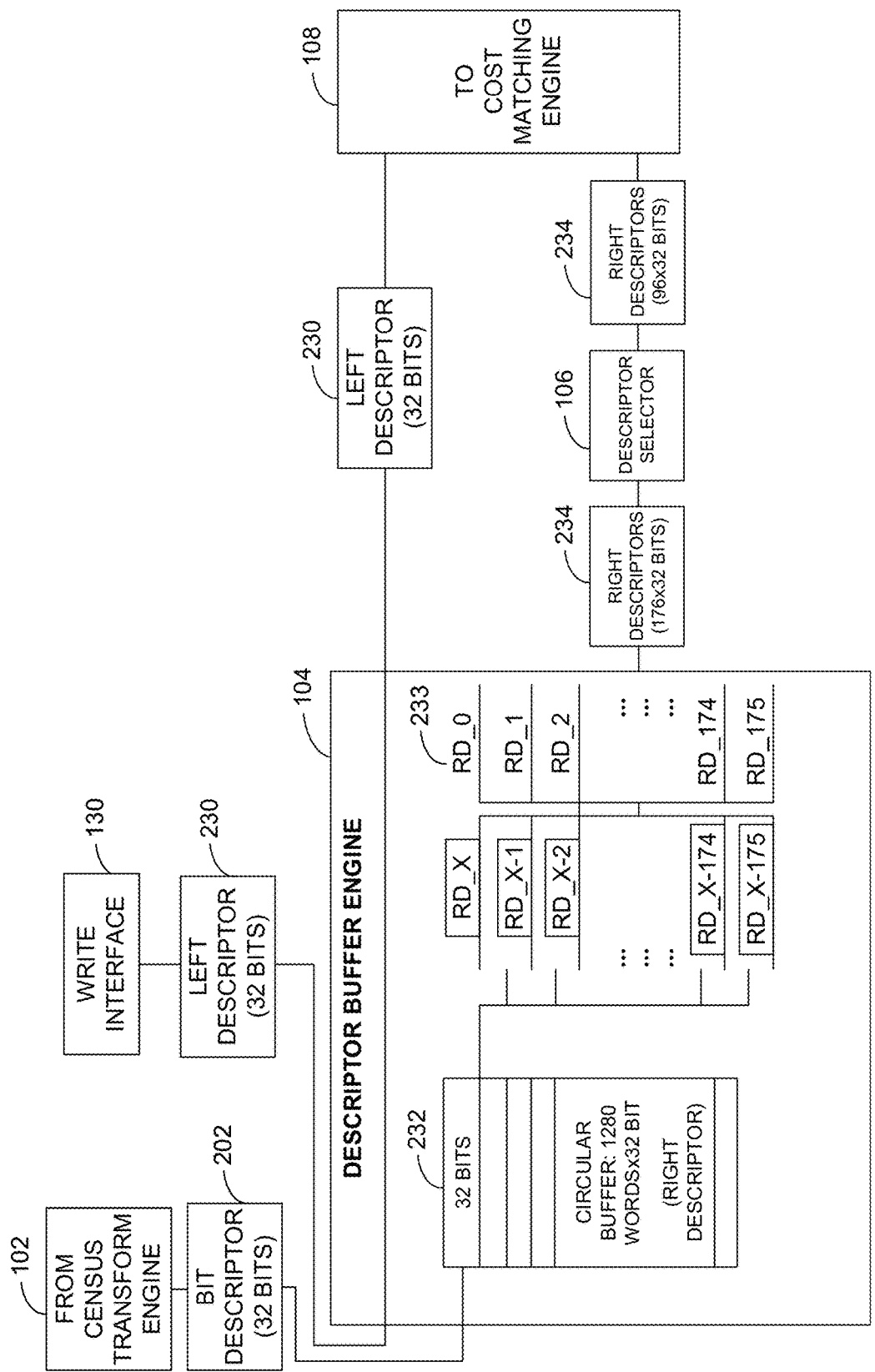
FIG. 2B is a schematic illustration of an example descriptor buffer engine of the example pipeline optimization system of FIG. 1.
Figure 2C:
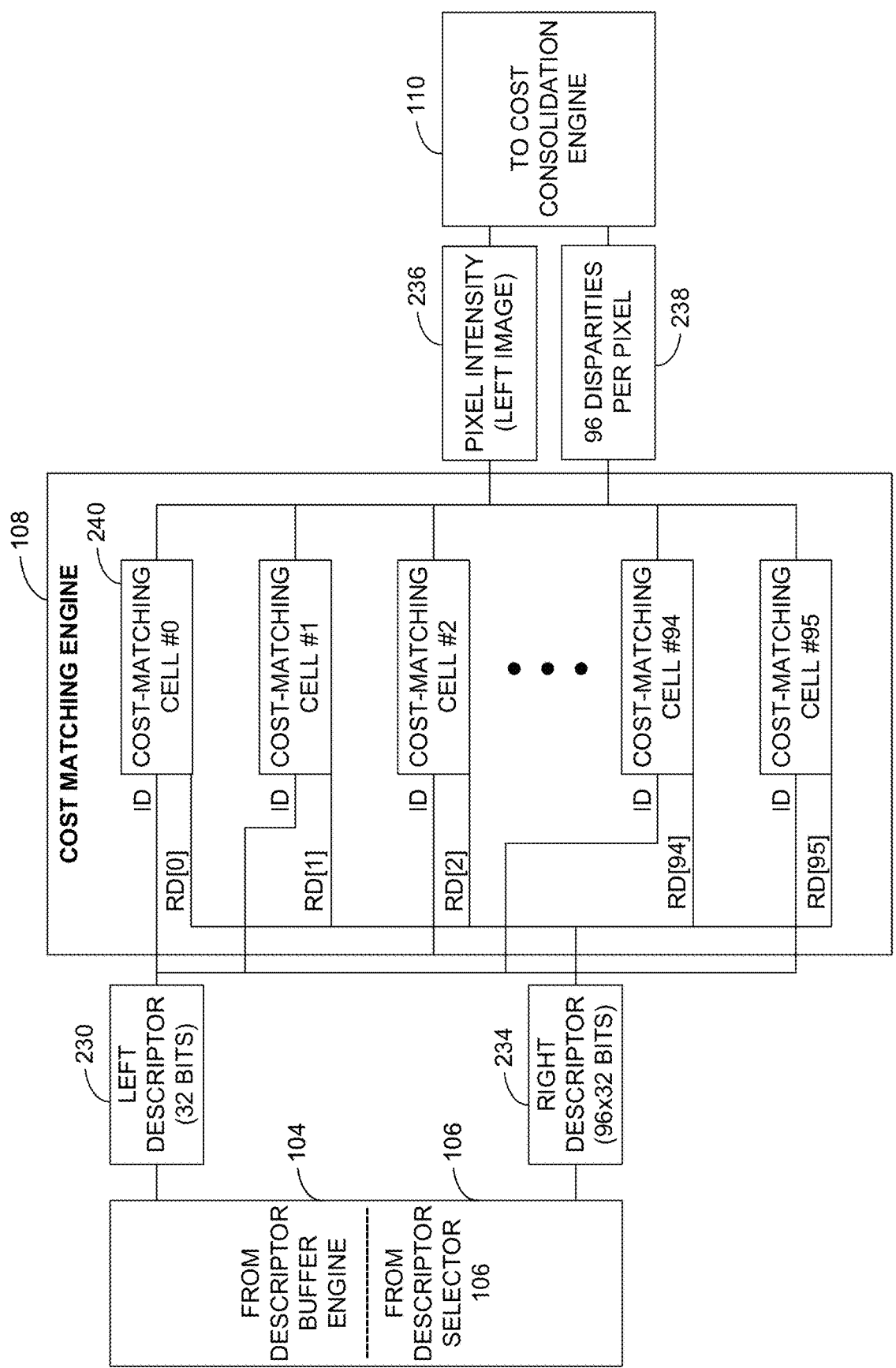
FIG. 2C is a schematic illustration of an example cost matching engine of the example pipeline optimization system of FIG. 1.
Figure 2D:
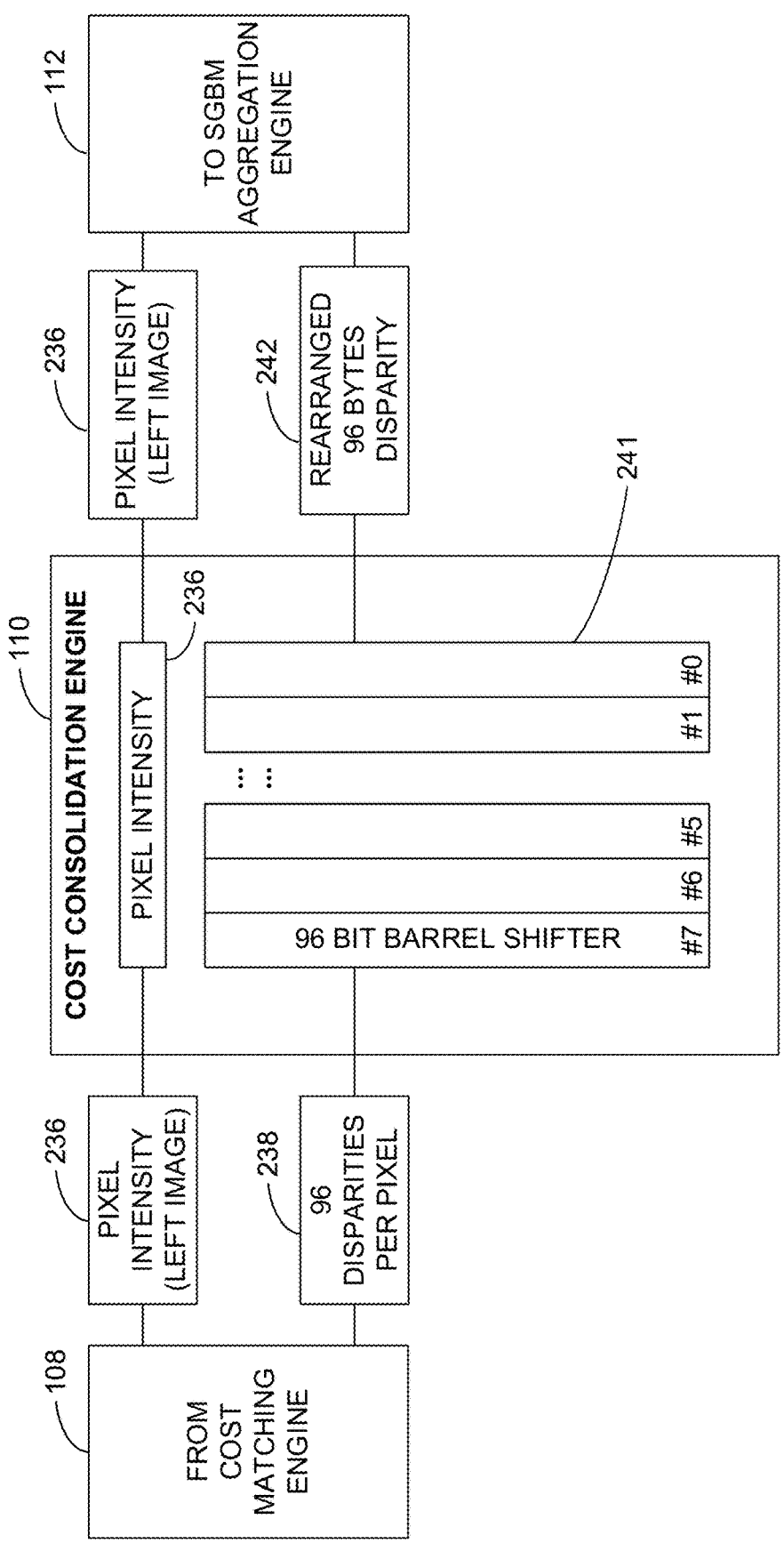
FIG. 2D is a schematic illustration of an example cost consolidation engine of the example pipeline optimization system of FIG. 1.
Figure 2E:
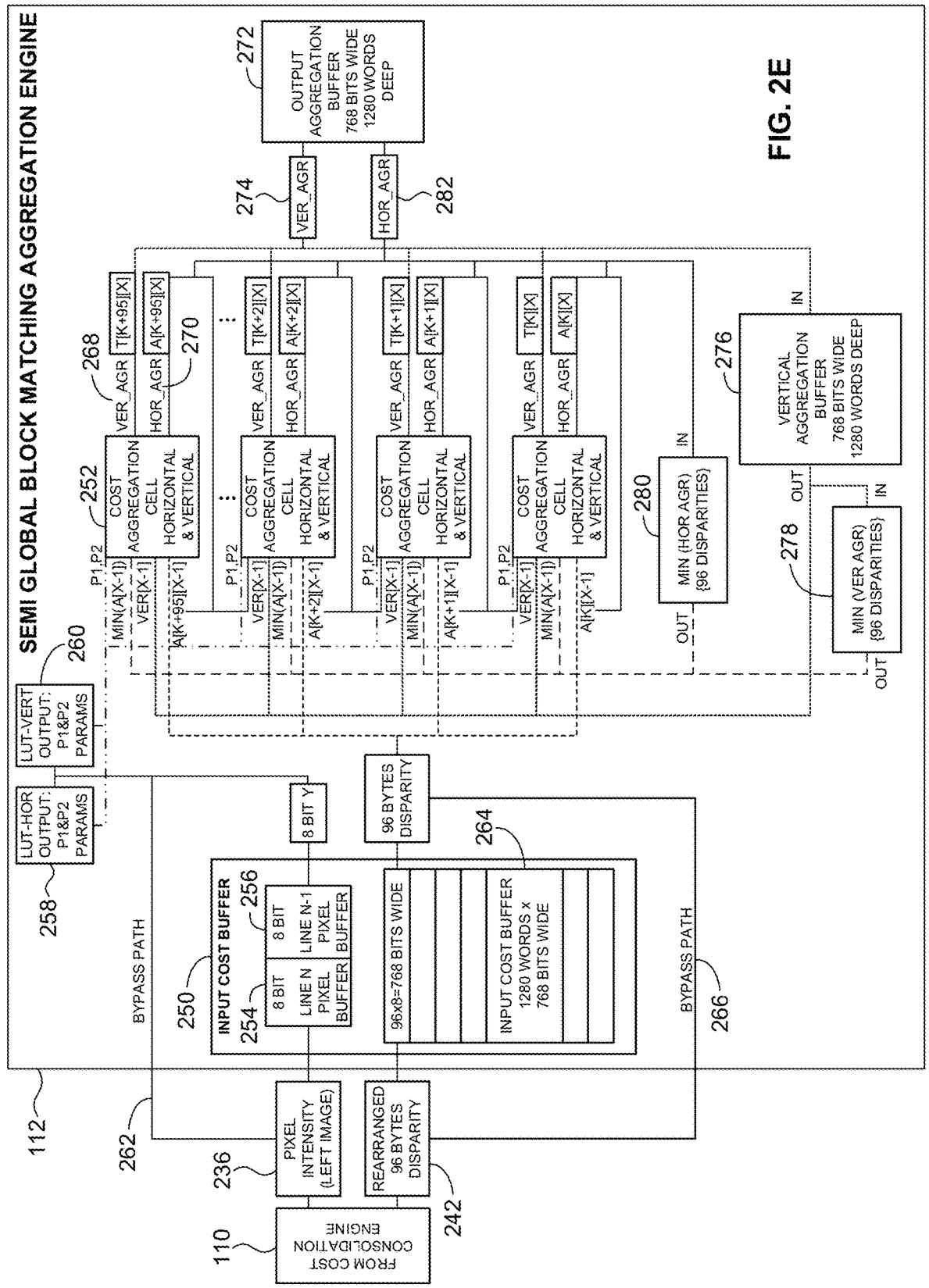
FIG. 2E is a schematic illustration of an example SGBM aggregation engine of the example pipeline optimization system of FIG. 1.

To improve the clarity of each stage in the example pipeline 114, the example CT engine 102 is shown in FIG. 2A, the example descriptor buffer engine 104 is shown in FIG. 2B, the example cost matching engine 108 is shown in FIG. 2C, the example cost consolidation engine 110 is shown in FIG. 2D, and the example SGBM aggregation engine 112 is shown in FIG. 2E.

In operation, raw image data is typically fed-in to the example CT engine 102 at the beginning of the example pipeline from an example input interface 116 of FIG. 1. In some examples, the input interface 116 of FIG. 1 corresponds to an image source (e.g., a camera, multiple cameras, a video camera, etc.) or memory that stores image data. In some examples, the input interface 116 of FIG. 1 is an Accelerator Memory Controller (AMC) interface (e.g., an AMC read client interface, etc.). Alternatively, the example input interface 116 may be a memory-mapped processor bus. For example, the input interface 116 is operative as a pseudo direct memory access (DMA) controller that streams data from memory into the pipeline 114.

In the illustrated example of FIG. 1, the input interface 116 obtains image data corresponding to an example left image 118 and/or an example right image 120. In some examples, the input interface 116 retrieves the image data from an example main memory 122. The example main memory 122 of FIG. 1 is dynamic random access memory (DRAM). Alternatively, the example main memory 122 may be static random access memory (SRAM), connection matrix (CMX) memory, etc.

In the illustrated example of FIG. 1, the image data stored in the main memory 122 includes pixel values of example pixels such as an example left pixel 124 included in the left image 118 and/or an example right pixel 126 included in the right image 120. For example, the pixel values can correspond to a pixel luminance (e.g., a pixel intensity) of the pixel. Each of the example left image 118 and the example right image 120 has a width X of 1280 pixels and a height Y of 1920 pixels, but examples disclosed herein are not limited thereto. For example, each line of the images 118, 120 corresponds to 1280 pixels and each column corresponds to 1920 pixels.

The raw image data (e.g., the pixel values of the example left pixel 124, the example right pixel 126, etc.) is processed by the example pipeline 114 to perform one or more image processing tasks, such as example stereo matching tasks described above. Each stage of the example pipeline 114 consumes a corresponding amount of resources (e.g., computing resources, bandwidth, memory resources, etc.) and, as such, a corresponding amount of power. In some examples, one or more stages of the example pipeline 114 can operate independently from one or more other stages of the example pipeline 114. As such, in circumstances where a particular stage is not needed, one or more stages may be deactivated and/or otherwise bypassed to reduce power, increase efficiency or speed of operation, etc., of the example pipeline 114.

In some examples, one or more stages are not needed because another (external) process may have performed a particular task related to that stage. As such, attempts to re-process a data feed is wasteful in terms of processing time and power consumption. In some examples disclosed herein, one or more stages are delayed from processing input data in an effort to conserve power. For example, the cost consolidation engine 110 may perform bit alignment operations that, if too large (e.g., exceeding one or more bit width thresholds), may consume a relatively large amount of processing power. As such, examples disclosed herein analyze the pipeline 114 to identify latency reduction opportunities to cause one or more stages to operate in an alternate order, refrain from operating, or modify a quantity of input data to be processed by the respective stage in an effort to conserve power. In some examples disclosed herein, a temporal dependency normally associated with a traditional pipeline is removed, thereby facilitating efficiency shortcuts and power conservation where appropriate.

In the illustrated example of FIG. 1, the pipeline optimization system 100 includes the CT engine 102 to transform pixel values associated with pixels into descriptors such as block descriptors or bit descriptors. The example CT engine 102 obtains raw image data corresponding to pixels included in the example left image 118, the example right image 120, etc., from the example input interface 116. The example CT engine 102 generates bit descriptors by comparing pixel values included in the raw image data to a comparison value. The raw image data can include pixel values associated with an example pixel kernel 128. The example pixel kernel 128 of FIG. 1 includes 25 pixels organized and/or otherwise arranged as a 5×5 pixel kernel. Alternatively, the raw image data may correspond to a 7×7 pixel kernel, a 7×9 pixel kernel, etc., or any other pixel kernel size. The example right pixel 126 of FIG. 1 is a central pixel (e.g., a center pixel) of the example pixel kernel 128.

In some examples, the CT engine 102 compares a pixel value of the central pixel 126 of the pixel kernel 128 to pixel values of the surrounding pixels of the pixel kernel 128 to generate a bit descriptor (e.g., 32-bit descriptor, a 64-bit descriptor, etc.) based on the comparison. For example, the CT engine 102 can output a right descriptor corresponding to a bit descriptor associated with the central pixel 126 in the right image 120. Alternatively, the example CT engine 102 may generate a bit descriptor where the comparison value is an average pixel value of the pixel kernel 128, a threshold value based on a value bigger than the central pixel value by a threshold, etc. In response to processing the example pixel kernel 128, the example CT engine 102 processes a second pixel kernel, where the second pixel kernel can be adjacent (e.g., on a right-side of the pixel kernel 128, beneath the pixel kernel 128, etc.) to the pixel kernel 128 depicted in FIG. 1. Alternatively, the second pixel kernel may include one or more pixels of the pixel kernel 128 of FIG. 1, where the pixel kernel 128 and the second pixel kernel overlap by one or more columns, indices, rows, etc., and/or a combination thereof.

In the illustrated example of FIG. 1, the CT engine 102 transmits the right descriptor to the descriptor buffer engine 104. In the illustrated example of FIG. 1, the CT engine 102 is coupled to the cost matching engine 108 (e.g., a write client of the CT engine 102 is coupled to a read client of the cost matching engine 108). Alternatively, the example CT engine 102 may not be coupled to the cost matching engine 108. The example descriptor buffer engine 104 retrieves and transmits a left descriptor from a first example write interface 130 to the example cost matching engine 108. In some examples, the first write interface 130 of FIG. 1 is an Accelerator Memory Controller (AMC) interface (e.g., an AMC write client interface, etc.). Alternatively, the first example write interface 130 may be a memory-mapped processor bus. The left descriptor corresponds to a bit descriptor associated with pixel values of pixels surrounding and/or otherwise proximate the example left pixel 124 from the example left image 118. In response to retrieving the left descriptor and/or the right descriptor, the example descriptor buffer engine 104 transmits the left descriptor to the example cost matching engine 108 and transmits one or more right descriptors including the right descriptor generated by the CT engine 102 to the example descriptor selector 106.

In the illustrated example of FIG. 1, the pipeline optimization system 100 includes the descriptor selector 106 to select a subset of the right descriptors from the descriptor buffer engine 104 based on disparity companding. Disparity companding enables the example pipeline optimization system 100 to extend an effective stereo depth range by taking sparse disparity points on the range. Disparity companding compresses the effective nominal range into a smaller effective range with less resolution. For example, resolution is higher on the shallow range values and the resolution progressively reduces on deep ranges. For example, the descriptor buffer engine 104 can output 176 right descriptors. The example descriptor selector 106 can select 96 of the 176 right descriptors by performing a sparse matching operation on the 176 right descriptors. In some examples, the descriptor selector 106 is implemented by one or more 2:1 multiplexers.

In the illustrated example of FIG. 1, the pipeline optimization system 100 includes the cost matching engine 108 to calculate and/or otherwise determine a matching cost or a matching parameter for each candidate disparity at each pixel. In some examples, the matching cost associated with a first pixel in a first image is a parameter (e.g., an integer value clamped in a range of 0 to 128, 0 to 255, etc.) calculated and/or otherwise determined based on an intensity of the first pixel and a suspected correspondence or a potential matching pixel in a second image. For example, the matching cost can represent a quantification of how similar a first position of a first pixel in a first image is to a second position of a second pixel in a second image. The example cost matching engine 108 of FIG. 1 determines the matching costs based on the bit descriptors retrieved and/or otherwise obtained from the descriptor buffer engine 104 and/or the descriptor selector 106. The example cost matching engine 108 identifies pixel intensity values and calculates disparity values, which are output to the example cost consolidation engine 110. For example, the cost matching engine 108 can determine a pixel intensity value of the left pixel 124 based on the 8 least significant bits (LSBs) of the left descriptor associated with the left pixel 124. In other examples, the cost matching engine 108 determines a disparity between the left pixel 124 and the pixels of the pixel kernel 128 based on a comparison of the left descriptor and the plurality of right descriptors. The disparity refers to a distance or a difference in coordinates (e.g., horizontal coordinates, vertical coordinates, etc.) between two corresponding points in the left image 118 and the right image 120, where the left image 118 and the right image 120 form an example stereo image pair 132.

In the illustrated example of FIG. 1, the pipeline optimization system 100 includes the cost consolidation engine 110 to realign processed image data due to a use of circular buffer strategy by at least one of the CT engine 102, the descriptor buffer engine 104, and the cost matching engine 108. In some examples, inputs to the example cost consolidation engine 110 are rather high, having, for example, 128 data sets with each data set having 32 bits. Rather than immediately perform an alignment on this quantity of data on the outset of the example descriptor buffer engine 104, examples disclosed herein wait for circumstances where a smaller number of bits per dataset is received and/or otherwise retrieved before performing a re-alignment. Stated differently, the realignment efforts are deferred to an alternate stage of the example pipeline 114 such as the example cost consolidation engine 110 in an effort to improve efficiency of the pipeline optimization system 100.

In the illustrated example of FIG. 1, the pipeline optimization system 100 includes the SGBM aggregation engine 112 to perform aggregation and refinement of matching costs and corresponding disparities generated by the cost matching engine 108 based on inputs received from the cost consolidation engine 110. Alternatively, the example SGBM aggregation engine 112 may be used on a stand-alone basis (e.g., external to the example pipeline 114) and retrieve inputs from the example main memory 122. In some examples, the SGBM aggregation engine 112 includes an input cost buffer and a plurality of aggregation cells communicatively coupled to one or more control signals to generate an output aggregation buffer associated with a final disparity value for each pixel of interest within the stereo image pair 132. The example SGBM aggregation engine 112 transmits the output aggregation buffer to a second example write interface 134. The second example write interface 134 of FIG. 1 is an Accelerator Memory Controller (AMC) interface (e.g., an AMC write client interface, etc.). Alternatively, the second example write interface 134 may be a memory-mapped processor bus.

In some examples, one or more components of the pipeline 114 of FIG. 1, and/or, more generally, the pipeline optimization system 100 of FIG. 1 operates in an output mode. For example, the output mode can be a disparity mode, a disparity plus error mode, a best and second best disparity mode, or an aggregation cost mode (e.g., a raw aggregation cost mode). In such examples, the pipeline optimization system 100 outputs an entire cost map or disparity map per pixel when operating in the disparity mode. The example pipeline optimization system 100 outputs a best (e.g., a minimum) and a second best (e.g., a second minimum) disparity when operating in the best and second best disparity mode. The example pipeline optimization system 100 outputs one or more aggregation costs when operating in the aggregation cost mode.

The example pipeline optimization system 100 outputs a disparity and a corresponding confidence metric (e.g., a confidence ratio) when operating in the disparity plus error mode. For example, pipeline optimization system 100 can use the confidence metric to determine and/or otherwise invalidate erroneous or inaccurate disparity predictions from the disparity map. In such examples, the pipeline optimization system 100 can replace such inaccurate disparity values with relevant or replacement values using different post-processing filters (e.g., a gap filling filter, a median filter, etc.). In some examples, the confidence metric is a ratio confidence (e.g., a ratio confidence metric). The ratio confidence uses a first minimum (c(p, d0)) and a second minimum (c(p, d1) from the matching costs (e.g., the matching cost vector) and determines the ratio confidence as described below in Equation (1):

$$r(p) = \frac{c(p, d0)}{(p, d1)0} * 255 \qquad \text{Equation (1)}$$

In the example of Equation (1) above, a value of the ratio confidence metric is in a range of 0 to 1 ([0,1]). In the example of Equation (1) above, a smaller value (e.g., r(p) approaching 0) corresponds to a high confidence that the determined disparity is an accurate estimate or determination compared to a disparity associated with a larger value (e.g., r(p) approaching 1) of the ratio confidence metric. For example, a higher confidence is associated with a disparity when the global minimum is smaller (e.g., smaller by a factor of 2, 5, 10, etc.) than the second minimum.

In some examples, the pipeline optimization system 100 determines that the calculated disparity associated with a pixel of interest is not valid, inaccurate, not to be used for an image processing task, etc., when the confidence ratio metric does not satisfy a threshold. For example, the pipeline optimization system 100 (e.g., one of the components of the pipeline optimization system 100 such as the SGBM aggregation engine 112) can compare the confidence metric ratio to a ratio threshold, and invalidate the associated disparity when the confidence metric ratio is greater than the ratio threshold. In response to determining that the associated disparity is invalid based on the comparison, the example pipeline optimization system 100 replaces the disparity value in the cost matching vector with a value associated with an invalid value identifier. The example pipeline optimization system 100 or an external component to the pipeline optimization system 100 can replace the value associated with the invalid value identifier with a relevant or a replacement value using one or more post-processing filters (e.g., a gap filling filter, a median filter, etc.).

While an example manner of implementing the example pipeline 114 of FIG. 1 is illustrated in FIG. 1, one or more of the elements, processes, and/or devices illustrated in FIG. 1 may be combined, divided, re-arranged, omitted, eliminated, and/or implemented in any other way. Further, the example CT engine 102, the example descriptor buffer engine 104, the example descriptor selector 106, the example cost matching engine 108, the example cost consolidation engine 110, the example SGBM aggregation engine 112, and/or, more generally, the example pipeline 114 of FIG. 1 may be implemented by hardware, software, firmware, and/or any combination of hardware, software, and/or firmware. Thus, for example, any of the example CT engine 102, the example descriptor buffer engine 104, the example descriptor selector 106, the example cost matching engine 108, the example cost consolidation engine 110, the example SGBM aggregation engine 112, and/or, more generally, the example pipeline 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example CT engine 102, the example descriptor buffer engine 104, the example descriptor selector 106, the example cost matching engine 108, the example cost consolidation engine 110, and/or the example SGBM aggregation engine 112 is/are hereby expressly defined to include a non-transitory computer readable storage device or storage disk such as a memory, a digital versatile disk (DVD), a compact disk (CD), a Blu-ray disk, etc., including the software and/or firmware. Further still, the example pipeline 114 of FIG. 1 may include one or more elements, processes, and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

FIG. 2A is a schematic illustration of the example CT engine 102 of the example pipeline optimization system 100 of FIG. 1. The example CT engine 102 generates and transmits a bit descriptor output such as an example right descriptor 202 to the example descriptor buffer engine 104. In the illustrated example of FIG. 2A, the CT engine 102 generates the right descriptor 202 by processing example pixels 204 of an example pixel kernel 206 associated with an image of a stereo image pair. In the illustrated example of FIG. 2A, each of the pixels 204 are 8 bits. Alternatively, each of the example pixels 204 may be 10 bits or any other number of bits. The example pixel kernel 206 of FIG. 2A can correspond to the example pixel kernel 128 of FIG. 1.

In the illustrated example of FIG. 2A, the CT engine 102 obtains image data from the input interface 116. In the example of FIG. 2A, the image data includes pixel values of the pixels 204 associated with an image of a stereo image pair. For example, the pixel values of the pixels 204 can correspond to the pixel values of the pixels included in the pixel kernel 128 of FIG. 1 of the right image 120 of the stereo image pair 132. The pixel values correspond to a luminance component or an intensity of the pixel.

In the illustrated example of FIG. 2A, the CT engine 102 obtains an example column 208 of pixel values from the input interface 116 during each time instance (e.g., a clock cycle) of operation. In the illustrated example of FIG. 2A, the pixel kernel 206 includes fives columns 208 including 5 pixels each to form a 5×5 pixel kernel. Alternatively, the example CT transform engine 102 may process 7×7 pixel kernels, 7×9 pixel kernels, or any other pixel kernel size.

In the illustrated example of FIG. 2A, the CT engine 102 calculates a sum of pixel values for the columns 208 of the pixel kernel 206 using an example pixel sum operator 210. In the illustrated example of FIG. 2A, each of the columns 208 is coupled to one of the pixel sum operators 210. Each of the pixel sum operator 210 calculates a sum of 5 pixel values of the column 208 to which the pixel sum operator 210 is coupled.

In the illustrated example of FIG. 2A, the CT engine 102 calculates an average of pixel values for the columns 208 of the pixel kernel 206 using an example pixel average operator 212. In the illustrated example of FIG. 2A, each of the pixel average operators 212 is coupled to one of the pixel sum operators 210 and an example Modulo N counter 214. Each of the example pixel average operator 212 calculates an average of 5 pixel values of the column 208 to which the pixel average operator 212 is coupled when commanded and/or otherwise instructed.

In the illustrated example of FIG. 2A, the CT engine 102 retrieves a new column of pixels 204 every clock cycle based on a circular buffer implementation or method. For example, the CT engine 102 replaces the oldest column with a new column while keeping the rest of the pixel kernel 206 in place to avoid extra switching or data movements. The example CT engine 102 of FIG. 2A uses the example Modulo N counter 214 to keep track and/or otherwise maintain an index corresponding to which of the columns 208 are to be replaced. For example, a first one of the columns 208 is replaced when the Modulo N counter 214 has a value of zero (e.g., ==0), a second one of the columns 208 is replaced when the Modulo N counter 214 has a value of one (e.g., ==1), etc. For example, the Modulo N counter 214 can be implemented using one or more flip flops (e.g., a D-type flip flop).

In operation, the example CT transform engine 102 retrieves and stores a first one of the columns 208a during a first clock cycle. A first one of the example pixel sum operators 210 coupled to the first column 208a calculates a sum of the five pixel values included in the first column 208a. A first one of the example pixel average operators 212 coupled to the first one of the example pixel sum operators 210 calculates an average of the five pixel values based on the sum calculated by the pixel sum operator 210 and the quantity of example pixels 204 included in the first example column 208a. For example, the pixel sum operator 210 and the pixel average operator 212 coupled to the first column 208a are triggered based on a value of 0 for the Modulo N counter 214. For example, first ones of the pixel sum operators 210 and the pixel average operators 212 can be triggered every fifth clock cycle. The first one of the example pixel average operators 212 transmits the calculated average to an example function (FN) 216 for processing.

During a second clock cycle, the example CT transform engine 102 retrieves and stores a second one of the columns 208b. A second one of the example pixel sum operators 210 coupled to the second example column 208b calculates a sum of the five pixel values included in the second column 208b. A second one of the example pixel average operators 212 coupled to the second one of the example pixel sum operators 210 calculates an average of the five pixel values based on the sum calculated by the pixel sum operator 210 and the quantity of pixels 204 included in the second column 208b. For example, the pixel sum operator 210 and the pixel average operator 212 coupled to the first column 208a are triggered based on a value of 1 for the Modulo N counter 214. The second one of the example pixel average operators 212 transmits the calculated average to the example function 216 for processing.

In response to the example function 216 receiving five pixel averages corresponding to the five example columns 208 of the example pixel kernel 206 (e.g., the Module N counter 214 has a value of 5), the function 216 computes a final average value of the pixel kernel 206 based on the partial averages calculated by the example pixel average operators 212. The example function 216 also retrieves example central pixels including a first example central pixel 218a, a second example central pixel 218b, and a third example central pixel 218c for an example census transform 220 to perform comparisons. For example, the CT engine 102 associates a central pixel of a portion or a window (e.g., the pixel kernel 128 of FIG. 1) of the input image (e.g., the right image 120 of FIG. 1) being processed to keep track of a current central pixel of the pixel kernel 206 during each clock cycle. For example, the first central pixel 218a corresponds to a central pixel of the pixel kernel 206. For example, the first central pixel 218a of FIG. 2A can correspond to the right pixel 126 of FIG. 1 and the pixel kernel 206 of FIG. 2A can correspond to the pixel kernel 128 of FIG. 1. The second example central pixel 218b corresponds to a central pixel of the next pixel kernel 206 of the input image when the window is shifted. For example, the second central pixel 218b can correspond to the central pixel of an adjacent pixel kernel to the pixel kernel 128 of FIG. 1.

In the illustrated example of FIG. 2A, the census transform 220 compares each of the pixel values of the pixels 204 to a central pixel of the pixel kernel 206. For example, the census transform 220 can compare the first central pixel 218a to each of the pixel values of the pixel kernel 206 and generate an example pre-mask bit descriptor 222 based on the comparison. In the illustrated example of FIG. 2A, the pre-mask bit descriptor 222 is a 25-bit descriptor based on the pixel kernel 206 having 25 pixels (e.g., 25 pixel values). In some examples, the pre-mask bit descriptor 222 can be a 49-bit descriptor when the pixel kernel 206 is a 7×7 pixel kernel. In other examples, the pre-mask bit descriptor 222 can be a 63-bit descriptor when the pixel kernel 206 is a 7×9 pixel kernel.

In the illustrated example of FIG. 2A, the census transform 220 assigns a 0 to one of the pixels 204 when the corresponding pixel value is less than or smaller than a comparison point. For example, the comparison point can be a pixel value of the central pixels 218a, 218b, 218c or an average of the pixel values of the pixel kernel 206 being processed. Alternatively, the comparison point may be a threshold value calculated based on adding a value to a pixel value of the central pixel to ensure that the pixel value being compared is bigger than the central pixel value by a defined (threshold) margin. In the illustrated example of FIG. 2A, the census transform 220 assigns a 1 to one of the pixels 204 when the corresponding pixel value is greater than or bigger than the comparison point.

The example census transform 220 of FIG. 2A transmits the example pre-mask bit descriptor 222 to example concatenation logic 224 to generate the right descriptor 202. The example right descriptor 202 of FIG. 2A is a 32-bit descriptor including a corresponding one of the example central pixels 218a, 218b, 218c (e.g., an 8-bit central pixel) and an example post-mask descriptor 226 based on the example pre-mask bit descriptor 222.

In the illustrated example of FIG. 2A, the concatenation logic 224 corresponds to zero latency, random bit concatenation logic. For example, the concatenation logic 224 can correspond to hardware logic that has negligible latency when processing inputs. The example concatenation logic 224 of FIG. 2A processes the 25 bits of the example pre-mask bit descriptor 222 into 24 bits of the example right descriptor 202 by applying an example concatenation mask 228 to the example pre-mask bit descriptor 222. The example CT engine 102 uses the example concatenation mask 228 to perform bitwise operations included in the example concatenation logic 224. Using the example concatenation mask 228, the example CT engine 102 can either set bits of the example pre-mask bit descriptor 222 on or off (e.g., select a bit or not select a bit) based on where the 1's are placed in the concatenation mask 228. The example concatenation mask 228 of FIG. 2A is 64 bits. Alternatively, the example concatenation mask 228 may be 32 bits or any other quantity of bits.

In some examples, the concatenation logic 224 concatenates a first set of bits (e.g., a string of 0 bits) to a second set of bits corresponding to bits in the pre-mask bit descriptor 222 whose rank is equal to the positions of 1's in the concatenation mask 228. For an example 16-bit input stream and an example corresponding 16-bit mask stream, the logic of the concatenation logic 224 is described below:

Example Input Stream: 0 1 1 0 0 1 0 1 1 0 0 0 0 1 0 1
Example Mask Stream: 0 0 1 0 0 0 1 0 0 1 1 0 0 1 1 0
Example Output Stream: 0 0 0 0 0 0 0 0 0 0 1 0 0 0 1 0

For example, indices 1, 2, 5, 6, 9, and 13 of the input stream have a rank (e.g., a bit position) equal to the positions of the 1's in the mask stream. For example, the values of the input stream at the same rank as the 1's in the mask stream are 1 0 0 0 1 0. The example concatenation logic 224 concatenates a string of zeros to the values of 1 0 0 0 1 0 to generate the output stream as described above. The example concatenation logic 224 of FIG. 2A can implement the example process described above for input streams of 25 bits, 49 bits, 63 bits, etc., and a corresponding mask stream (e.g., a concatenation mask) of 64 bits. Alternatively, the example concatenation mask 228 may include a different quantity of bits (e.g., 32 bits). The example concatenation logic 224 of FIG. 2A and/or, more generally, the example CT engine 102 transmits the example right descriptor 202 to the example descriptor buffer engine 104 of FIG. 1.

FIG. 2B is a schematic illustration of the example descriptor buffer engine 104 of the example pipeline optimization system 100 of FIG. 1. The example descriptor buffer engine 104 is a buffer that transfers and/or otherwise facilitates a data exchange between (1) at least one of the example CT transform engine 102 of FIGS. 1 and 2A or the first example write interface 130 of FIG. 1 and (2) the example descriptor selector 106 and/or the example cost matching engine 108 of FIG. 1.

In the illustrated example of FIG. 2B, the descriptor buffer engine 104 obtains the right descriptor 202 from the CT engine 102. The example right descriptor 202 of FIG. 2B is a 32-bit descriptor corresponding to one of the central pixels 218a, 218b, 218c last processed by the CT engine 102. Alternatively, the example right descriptor 202 may be 64-bits or any other number of bits.

In the illustrated example of FIG. 2B, the descriptor buffer engine 104 obtains an example left descriptor 230 from the first write interface 130. In the illustrated example of FIG. 2B, the left descriptor 230 is a 32-bit descriptor corresponding to the left pixel 124 of FIG. 1. Alternatively, the example left descriptor 230 may be 64 bits or any other number of bits. The example descriptor buffer engine 104 passes the example left descriptor 230 through to the example cost matching engine 108. Alternatively, the example descriptor buffer engine 104 may temporarily store (e.g., for one clock cycle, two clock cycles, etc.) the example left descriptor 230 until requested to be transmitted to the example cost matching engine 108.

In operation, during a first phase, the example descriptor buffer engine 104 obtains and stores the post-mask bit descriptor 202 of FIG. 2A as produced by the example CT engine 102. For example, during the first phase, the descriptor buffer engine 104 stores one or more right descriptors associated with pixels of the right image 120 of FIG. 1 as produced by the CT engine 102. The example descriptor buffer engine 104 stores the example post-mask bit descriptor 202 in an example circular buffer 232. The example circular buffer 232 of FIG. 2B stores 1280 words, where each word is 32 bits, but examples disclosed herein are not limited thereto. The example circular buffer 232 holds 1280 words to be capable of storing a bit descriptor for each pixel in a line of the example right image 120. Alternatively, the example circular buffer 232 may store fewer or more than 1280 words and/or each word may be fewer or more than 32 bits.

During a second phase, for each clock cycle, the example descriptor buffer engine 104 obtains the example left descriptor 230 corresponding to a pixel of the left image 118 of FIG. 1 (e.g., the left pixel 124 of FIG. 1). During the second phase, the example descriptor buffer engine 104 transmits the example left descriptor 230 to the example cost matching engine 108. Alternatively, the example descriptor buffer engine 104 may transmit a left descriptor received from the CT engine 102. During the second clock cycle, the example descriptor buffer engine 104 transmits 176 example right descriptors 234, where each one of the right descriptors 234 is 32 bits, to the example descriptor selector 106, but examples disclosed herein are not limited thereto. For example, the descriptor buffer engine 104 can read 176 of the stored descriptors from the circular buffer 232 starting at a first index (RD_X) through a $176^{th}$ index (RD_X-175) and output the stored descriptors in an example output buffer 233 for transmission. For example, the term X refers to the current clock cycle. For example, during a first clock cycle, X=1, during a second clock cycle, X=2, etc. In examples where the current clock cycle makes an index negative (e.g., X=2 makes index RD_X-175 equal to RD_-173), the descriptor buffer engine 104 replaces the negative indices with the lowest non-negative index. For example, when the clock cycle is 2, the descriptor buffer engine 104 reads RD_0, RD_1, and RD_2, where the remaining indices (e.g., RD_X-174, RD_X-175, etc.) are replaced with the descriptor associated with RD_0. In such examples, the descriptor buffer engine 104 transfers 5664 bits per clock cycle (e.g., 5664 bits/clock cycle=((1 left descriptor×32 bits/left descriptor)+(176 right descriptors×32 bits/right descriptor)) corresponding to approximately 4 gigabytes (GB) per second based on a frequency of 700 megahertz (MHz).

During the second phase, for each clock cycle, the example descriptor selector 106 performs a companding operation (e.g., a disparity companding operation) to compress and/or otherwise reduce the 176 example right descriptors 234 to 96 right descriptors 234 based on Equation (2) below:

$$D=N+M+T \qquad \text{Equation (2)}$$

In the example of Equation (2) above, the example descriptor selector 106 determines a quantity of disparities (D) (also referred to herein as a disparity quantity (D)) to be calculated by the example cost matching engine 108. In the illustrated example of FIG. 2B, the descriptor selector 106 determines D to be 96. The example descriptor selector 106 selects 96 of the 176 right descriptors 234 from the example descriptor buffer engine 104 based on D=96, a first companding parameter N=48, a second companding parameter M=32, and a third companding parameter T=16. For example, the descriptor selector 106 can compress the 176 right descriptors 234 into 96 right descriptors 234 by matching pixel by pixel for N disparities, matching every $2^{nd}$ pixel for M disparities, and matching every $4^{th}$ pixel for T disparities as described below:

Each descriptor from Descriptor 1 to Descriptor 48 of the 176 right descriptors 234 are selected based on N=48 to yield 48 descriptors;

Every $2^{nd}$ descriptor from Descriptor 49 to Descriptor 112 of the 176 right descriptors 234 based on M=32 to yield 32 descriptors; and Every $4^{th}$ descriptor from Descriptor 113 to Descriptor 176 of the 176 right descriptors 234 based on T=16 to yield 16 descriptors. The example descriptor selector 106 can select 96 of the 176 right descriptors 234 (e.g., 96=48+32+16) based on values of N, M, and T as described above. Alternatively, any other values of N, M, and/or T may be used. In response to selecting 96 of the 176 right descriptors 234, the example descriptor selector 106 transmits the 96 descriptors to the example cost matching engine 108.

During the second phase, for each clock cycle, the example descriptor buffer engine 104 stores and/or transfers another left descriptor 230 corresponding to a second pixel included in the left image 118 of FIG. 1. For example, the second pixel can be an adjacent pixel to a right side of the left pixel 124 in the left image 118 or on an adjacent line below the left pixel 124. During the second phase, the example descriptor buffer engine 104 stores another example right descriptor 202 in the example circular buffer 232. For example, the descriptor buffer engine 104 can store the right descriptor 202 in an empty or non-occupied location in the circular buffer 232 or can replace an oldest one of the stored descriptors in the circular buffer 232.

FIG. 2C is a schematic illustration of the example cost matching engine 108 of the example pipeline optimization system 100 of FIG. 1. The example cost matching engine 108 identifies and/or otherwise determines an example pixel intensity 236 associated with the example left pixel 124 of FIG. 1 and determines example disparities 238 associated with the left pixel 124 based on the example left descriptor 230 and the example right descriptors 234 of FIG. 2B.

In the illustrated example of FIG. 2C, the cost matching engine 108 identifies the pixel intensity 236 and determines the disparities 238 using example cost matching cells 240. In the illustrated example of FIG. 2C, there are 96 of the cost matching cells 240. Alternatively, the example cost matching engine 108 may use fewer or more than 96 of the example cost matching cells 240. Each of the example cost matching cells 240 obtains the left descriptor 230 and one of the example right descriptors 234 indicated by RD[0], RD[1], RD[127], etc. The example cost matching cells 240 determine a matching cost indicative of how close/far the left pixel 124 is from a camera source by calculating disparities between the left pixel 124 and corresponding pixels in the pixel kernel 128 included in the right image 120 of FIG. 1. The example cost matching cells 240 calculate the disparities based on an example cost function described below in Equations (3) and (4):

$$\text{COMB\_COST}=\alpha*AD+\beta*(\text{CTC}\ll 3) \qquad \text{Equation (3)}$$

$$\text{CLAMP}(\text{COMB\_COST}\gg 5,127) \qquad \text{Equation (4)}$$

In the example of Equation (3) above, the matching cost (COMB_COST) represents a parameter measuring and/or otherwise quantifying a similarity of image locations for a first pixel in a first image and a second pixel in a second image of a stereo image pair. The example of Equation (3) above is an arithmetical function that reduces (e.g., minimizes) a correlation between two pixels. For example, the smaller the value for the COMB_COST, the better the correlation between the two pixels from the two planes (e.g., the left image 118 and the right image 120 of FIG. 1).

In the example of Equation (3) above, the terms α and β are programmable values (e.g., constant values). In some examples, α and β are values that can range from 0 to 15. For example, a can have a value of 8 and β can have a value of 12. In the example of Equation (3) above, AD is the absolute difference between two pixel values. For example, the cost matching cell 240 can determine the absolute difference by calculating a difference between a first 8 bits of the left descriptor 230 and the first 8 bits of the corresponding right descriptor 234. In the example of Equation (3) above, CTC is the census transform cost between two pixels based on Hamming distance. For example, CTC is the Hamming distance based on the number of 1's in the bit-wise XOR operation between the left descriptor 230 and the corresponding right descriptor 234. In the example of Equation (3) above, "<<" refers to a left-shift operation. As such, "CTC<<3" represents shifting the CTC to the left by 3 bits.

In the example of Equation (4) above, ">>" refers to a right-shift operation. As such, "COMB_COST>>5" represents shifting the COMB_COST to the right by 5 bits. In the example of Equation (4) above, the example cost matching cells 240 clamp the shifted COMB_COST value to an integer in a range of 0 to 127. In the illustrated example of FIG. 2C, the cost matching cells 240 generate the disparities 238 by using the examples of Equations (3) and (4) above. For example, each of the cost matching cells 240 generates one of the 96 disparities 238, where the 96 disparities correspond to one of the pixels in the left image 118 (e.g., the left pixel 124). The example cost matching engine 108 transmits at least one of the example pixel intensity 236 or the 96 disparities 238 per left pixel to the example cost consolidation engine 110.

FIG. 2D is a schematic illustration of the example cost consolidation engine 110 of the example pipeline optimization system 100 of FIG. 1. In the illustrated example of FIG. 2D, the cost consolidation engine 110 receives and/or otherwise obtains the pixel intensity 236 of FIG. 2C from the cost matching engine 108 of FIG. 2C. In the illustrated example of FIG. 2D, the cost consolidation engine 110 receives and/or otherwise obtains the 96 disparities 238 of FIG. 2C from the cost matching engine 108.

In the illustrated example of FIG. 2D, the cost consolidation engine 110 reduces power required for an operation of the pipeline optimization system 100 by reducing data movements in example barrel shifters 241. The example cost consolidation engine 110 of FIG. 2D includes 8 of the example barrel shifters 241. Alternatively, the example cost consolidation engine 110 may include fewer or more than 8 of the barrel shifters 241. For example, the cost consolidation engine 110 replaces data included in the barrel shifters 241 in a circular manner. In such examples, the cost consolidation engine 110 replaces data in one of the barrel shifters 241 (e.g., #0 barrel shifter, #1 barrel shifter, etc.) corresponding to which one of the barrel shifters 241 includes the oldest data out of the barrel shifters 241. Each of the example barrel shifters 241 store 96 bits, where each bit corresponds to one of the disparities 238 retrieved from the cost matching engine 108, but examples disclosed herein are not limited thereto. For example, each of the 96 disparities 238 are one bit (e.g., 96 disparities correspond to 96 bits in total) and can be stored entirely in one of the barrel shifters 241.

In the illustrated example of FIG. 2D, the cost consolidation engine 110 rearranges the disparities 238 received from the cost matching engine 108 from newest data to oldest data. For example, the cost consolidation engine 110 can rearrange the 96 disparities 238, where the disparity associated with the newest pixel data is set to rank 0 and the oldest pixel data is set to rank 95. In response to rearranging the data from the example cost matching engine 108 via the example barrel shifters 241, the cost consolidation engine 110 transmits example rearranged data 242 to the example SGBM aggregation engine 112. The example rearranged data 242 includes data stored in each of the example barrel shifters 241, including the newest rearranged data based on the 96 disparities 238 retrieved from the example cost matching engine 108. The example rearranged data 242 of the illustrated example of FIG. 2D is 96 bytes (e.g., 96 bytes=(12 bytes/barrel shifter)×8 barrel shifters)).

FIG. 2E is a schematic illustration of the example SGBM aggregation engine 112 of the example pipeline optimization system 100 of FIG. 1. The example SGBM aggregation engine 112 uses a semi global technique to aggregate a cost map or a disparity map. A disparity map (e.g., a graph, a plot, a table, etc.) can correspond to a mapping of a disparity value as a function of depth. For example, the disparity map can be used to generate a function that determines a distance of a camera to an image feature (e.g., a cup, an animal, a face, etc.) in a scene captured by the camera, where the distance between the camera and the image feature is referred to as the depth. For example, the SGBM aggregation engine 112 generates a disparity map based on a set of disparity values for each pixel in the example left image 118. In such examples, the SGBM aggregation engine 112 can generate a disparity map for the left pixel 124 by calculating a quantity of disparities corresponding to the depth range (e.g., a depth range of 64 disparities, 96 disparities, etc.) and mapping the disparities to depths or distances between the left pixel 124 and a camera source. In response to generating the disparity map, the example SGBM aggregation engine 112 can determine a minimum value of the disparity map. In some examples, the minimum value corresponds to a difference in coordinates (e.g., horizontal coordinates, vertical coordinates, etc.) between the left pixel 124 and a matching one of the pixels of the right image 120. In other examples, the minimum value corresponds to a depth of the left pixel 124 with respect to the camera source.

The semi global technique is associated with a class of algorithms known as dynamic programming, or belief propagation. In belief propagation, a belief or a marginal cost (e.g., an estimated value) is propagated along a particular path, where the previous pixel considered (e.g., the left pixel 124 of FIG. 1) influences a choice made at a current pixel (e.g., an adjacent pixel to a right side of the left pixel 124). The example SGBM aggregation engine 112 reduces and/or otherwise minimizes a global two-dimensional (2D) energy function based on disparities between the left pixel 124 and pixels included in the right pixel kernel 128 of FIG. 1 to generate a path cost $L_r$, where r is the number of evaluated paths. The example SGBM aggregation engine 112 determines a path cost as described below in Equation (5) for each path:

$$L_r(x, y, d) = C(x, y, d) + \min[E(x - 1, y, d),$$
$$E(x - 1, y, d - 1) + P_1,$$
$$E(x - 1, y, d + 1) + P_1,$$
$$\min_i(E(x - 1, y, i) + P_2)]$$

Equation (5)

The example SGBM aggregation engine 112 uses the example of Equation (5) above to search a minimum path cost inclusive possibly added penalties $P_1$ and $P_2$ at the position of the previous pixel in a path (e.g., a path direction) and adds the minimum path cost to the cost value C(x, y, d) at the current pixel x and the disparity d.

In the example of Equation (5) above, the first term C(x, y, d) represents the matching cost C between a first pixel (x) in a first image (e.g., the left pixel 124 of FIG. 1) and a second pixel (y) in a second image (e.g., the right pixel 126 of FIG. 1) with a disparity (d). For example, the first term represents the matching cost of a pixel in the path r. The second term (E(x−1, y, d)) represents a first energy corresponding to a matching cost between an adjacent pixel to the first pixel (x−1) and the second pixel with the disparity. For example, the second term adds the lowest matching cost of the previous pixel (x−1) in the path r. The third term (E(x−1, y, d−1)+P$_1$) represents a second energy corresponding to a matching cost between the adjacent pixel and the second pixel with a disparity value associated with the adjacent pixel (d−1), where a first penalty value P$_1$ is added to the matching cost for disparity changes. The first penalty value is added to the matching cost to throttle and/or otherwise increase the influence of a previous aggregation result (E(x−1, y, d)) in the current pixel result E(x, y, d). The fourth term $$\left(\min_i(E(x-1, y, i) + P_2)\right)$$

prevents constantly increasing path matching costs by subtracting the minimum path matching cost of the previous pixel from the whole term.

The example SGBM aggregation engine 112 calculates a sum of the energies for each path as described below in Equation (6):

$$S(x, d) = \sum_{r=1}^{3} L_r(x, d) \quad \text{Equation (6)}$$

In the example of Equation (6) above, the example SGBM aggregation engine 112 calculates a sum of three (3) path costs. Alternatively, the example SGBM aggregation engine 112 may calculate fewer or more than three path costs based on a configuration of one or more components of the example pipeline 114 of FIG. 1. The example SGBM aggregation engine 112 determines a final disparity between the left pixel 124 of FIG. 1 and the right pixel 126 of FIG. 1 by searching for and/or otherwise determining the minimum disparity for each path. The example SGBM aggregation engine 112 stores the final disparity for each pixel of the left image 118 of FIG. 1 to generate the disparity map.

In some examples, multiple paths as being the input path into each pixel is considered. In the illustrated example of FIG. 2E, the SGBM aggregation engine 112 implements at least one of a first path corresponding to a leftward movement of the current pixel (e.g., a horizontal path), a second path corresponding to a rightward movement of the current pixel (e.g., a horizontal path), or a third path corresponding to a vertical movement above the current pixel (e.g., a vertical path). In such examples, the quantity of paths considered is a parameter to be used by the SGBM aggregation engine 112 to process image data.

The example SGBM aggregation engine 112 of FIG. 2E includes an example input cost buffer 250 and example cost aggregation cells 252. The example input cost buffer 250 includes a first example pixel buffer 254 and a second example pixel buffer 256. Each of the example pixel buffers 254, 256 are 8 bits corresponding to a quantity of bits of the example pixel intensity 236 retrieved from the example cost consolidation engine 110. Alternatively, the first and second example pixel buffers 254, 256 may be 10 bits when the example pixel intensity 236 is 10 bits. The first example pixel buffer 254 obtains and stores a current pixel value being processed (e.g., the left pixel 124 of FIG. 1). The second example pixel buffer 256 obtains and stores a previously processed pixel value (e.g., an adjacent pixel to a left side of the left pixel 124). The second example pixel buffer 256 maps and/or otherwise outputs the previously processed pixel value (8 BIT Y) to a first example look-up table (LUT) 258 and a second example LUT 260. The example SGBM aggregation engine 112 transmits the example pixel intensity 236 to the first and second example LUT 258, 260 via a first example bypass path 262.

In the illustrated example of FIG. 2E, the first LUT 258 corresponds to a horizontal output. For example, the SGBM aggregation engine 112 can transmit the pixel intensity 236 of the current pixel to the first LUT 258 via the first bypass path 262 and the pixel intensity of a previously processed pixel to the first LUT 258 via the second pixel buffer 256. In such examples, the first LUT 258 calculates an absolute difference between the current pixel value and the previously processed pixel value and maps the absolute difference to at least one of a first penalty value (P$_1$) or a second penalty value (P$_2$). In response to the mapping, the first example LUT 258 transmits at least one of the first penalty value or the second penalty value to each of the example cost aggregation cells 252.

In the illustrated example of FIG. 2E, the second LUT 260 corresponds to a vertical output. For example, the SGBM aggregation engine 112 can transmit the current pixel value to the second LUT 260 via the first bypass path 262 and the previously processed pixel value to the second LUT 260 via the second pixel buffer 256. In such examples, the second LUT 260 calculates an absolute difference between the current pixel value and the previously processed pixel value and maps the absolute difference to at least one of a first penalty value (P$_1$) and a second penalty value (P$_2$). In response to the mapping, the second example LUT 260 transmits at least one of the first penalty value or the second penalty value to each of the example cost aggregation cells 252.

In the illustrated example of FIG. 2E, the input cost buffer 250 includes an example input cost storage 264. The example input cost storage 264 of FIG. 2E includes 1280 words, where each of the words are 768 bits, but examples disclosed herein are not limited thereto. For example, each of the words corresponds to a received one of the example rearranged data 242 received from the example cost consolidation engine 110. For example, an instance of the rearranged data 242 is 96 bytes or 768 bits. The example input cost storage 264 transmits a previously processed set of the example rearranged data 242 to each of the example cost aggregation cells 252. The example SGBM aggregation engine 112 transmits the current set of the example rearranged data 242 to each of the cost aggregation cells 252 via a second example bypass path 266.

In the illustrated example of FIG. 2E, the SGBM aggregation engine 112 includes 96 cost aggregation cells 252 to evaluate and/or otherwise refine matching costs associated with each path of interest, however, only four of the 96 are shown for clarity. For example, each of the cost aggregation cells 252 calculates a matching cost associated with at least one of a horizontal path or a vertical path of the current pixel. Each of the example cost aggregation cells 252 calculates an example vertical aggregate cost (TOP_AGR) 268 and an example horizontal aggregate cost (HOR_AGR) 270. For example, a first one of the cost aggregation cells 252 generates a vertical aggregate cost (T) associated with T[K+3][X], where X is the pixel of an input stream, and K is an index of a 96 cost matching set of the X pixel. For example, an input stream of an aggregate direction (e.g., a left-to-right direction, a right-to-left direction, etc.) is an array of pixels having a width of an image line (e.g., a line of the left image 118), where each of the pixels has 96 corresponding bits representing the matching costs for the pixel. For example, [K+3][X] represents a K+3 index of the 96 matching costs for an input stream index X. In such examples, the first one of the cost aggregation cells 252 generates a horizontal aggregate cost (A) associated with A[K+3][X].

In the illustrated example of FIG. 2E, each of the cost aggregation cells 252 outputs the vertical aggregate cost 268 to an example output aggregation buffer 272 via an example intermediate vertical aggregation buffer 274 and an example vertical aggregation buffer 276. The example output aggregation buffer 272 of FIG. 2E stores 1280 words, where each of the words are 768 bits, but examples disclosed herein are not limited thereto. The example output aggregation buffer 272 stores each of the example vertical aggregate costs 268 from the example cost aggregation cells 252. The example vertical aggregation buffer 276 of FIG. 2E includes 1280 words, where each of the words are 768 bits, but examples disclosed herein are not limited thereto.

In the illustrated example of FIG. 2E, the example vertical aggregation buffer 276 stores each of the example vertical aggregate costs 268 prior to transmitting the vertical aggregate costs 268 to an example vertical minimum cost determiner 278. The example vertical minimum cost determiner 278 identifies and/or otherwise determines a minimum value out of 96 costs including the four example vertical aggregate costs 268 generated by the example cost aggregation cells 252, where the 96 costs are associated with 96 disparities. In response to determining the minimum vertical aggregate cost, the example vertical minimum cost determiner 278 transmits the minimum vertical aggregate cost to respective inputs of each of the example cost aggregation cells 252.

In the illustrated example of FIG. 2E, each of the cost aggregation cells 252 output the horizontal aggregate cost 270 to respective inputs of the cost aggregation cells 252, an example horizontal minimum cost determiner 280, and the example output aggregation buffer 272 via an example intermediate horizontal aggregation buffer 282. The example horizontal minimum cost determiner 280 of FIG. 2E identifies and/or otherwise determines a minimum value out of 96 costs including the four example horizontal aggregate costs 270 generated by the example cost aggregation cells 252, where the 96 costs are associated with 96 disparities. In response to determining the minimum horizontal aggregate cost, the example horizontal minimum cost determiner 280 transmits the minimum horizontal aggregate cost to respective inputs of each of the example cost aggregation cells 252.

Figure 3:
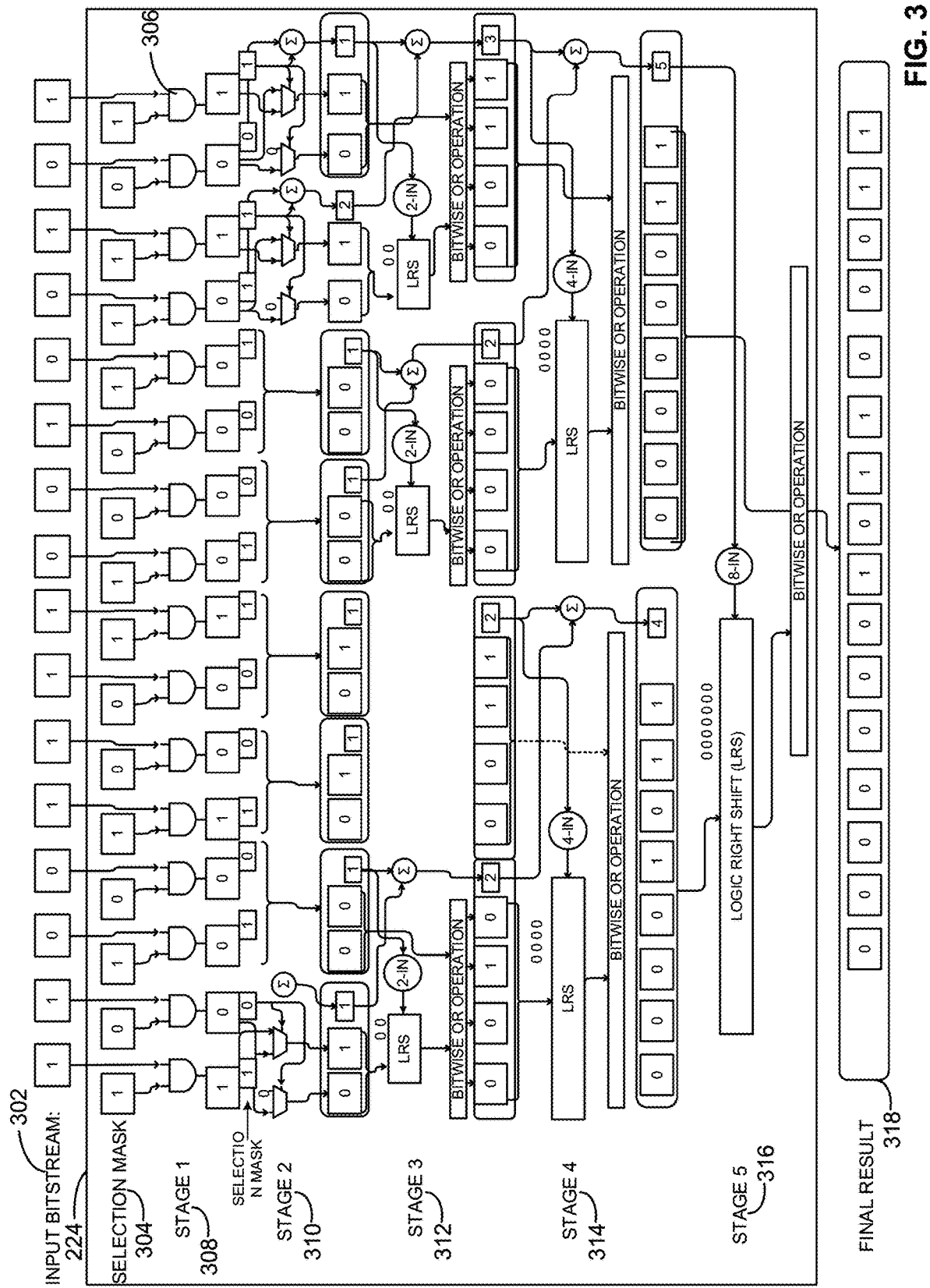
FIG. 3 is a schematic illustration of example concatenation logic constructed in accordance with the teachings of this disclosure.

FIG. 3 is a schematic illustration of the example concatenation logic 224 of FIG. 2A. FIG. 3 depicts the example concatenation logic 224 for a 16-bit example for clarity purposes. For example, the concatenation logic 224 can obtain and process a 24 bit descriptor input, a 49 bit descriptor input, a 63 bit descriptor input, etc. The example concatenation logic 224 represents a sorting tree approach with a minimum depth of log(N)+1 stages, where N is the input stream length. In the illustrated example of FIG. 3, an example input bitstream 302 is processed with an example selection mask 304. The example input bitstream 302 of FIG. 3 is 16 bits. Alternatively, the example input bitstream 302 may be any other quantity of bits such as, but not limited to, 24 bits, 49 bits, or 63 bits. The example selection mask 304 of FIG. 3 is 16 bits. Alternatively, the example selection mask 304 may be any other quantity of bits such as, but not limited to, 32 bits or 64 bits. The example selection mask 304 can correspond to the example concatenation mask 228 of FIG. 2A.

In the illustrated example of FIG. 3, first bits of the input bitstream 302 and second bits of the selection mask are processed with example logic AND gates 306 during a first example stage 308. Alternatively, the first example stage 308 may be removed. In the illustrated example of FIG. 3, a second example stage 310 includes a series of 2-bit sorting trees that align towards the least significant bit (LSB) of the input bitstream 302 by a mask bit of value 1 while also counting the quantity of shifts needed in each 2-bit pair.

In the illustrated example of FIG. 3, a third example stage 312 includes 4-bit sorting trees based on the previous 2-bit pairs of the second stage 310. In the illustrated example of FIG. 3, a fourth example stage 314 includes 8-bit sorting trees based on the previous 4-bit pairs of the third stage 312. In the illustrated example of FIG. 3, a fifth example stage 316 performs a bitwise OR operation on the previous 8-bit pairs to generate an example final result 318. The example final result 318 of FIG. 3 can correspond to the example post-mask descriptor 226 of FIG. 2A.

Figure 4:
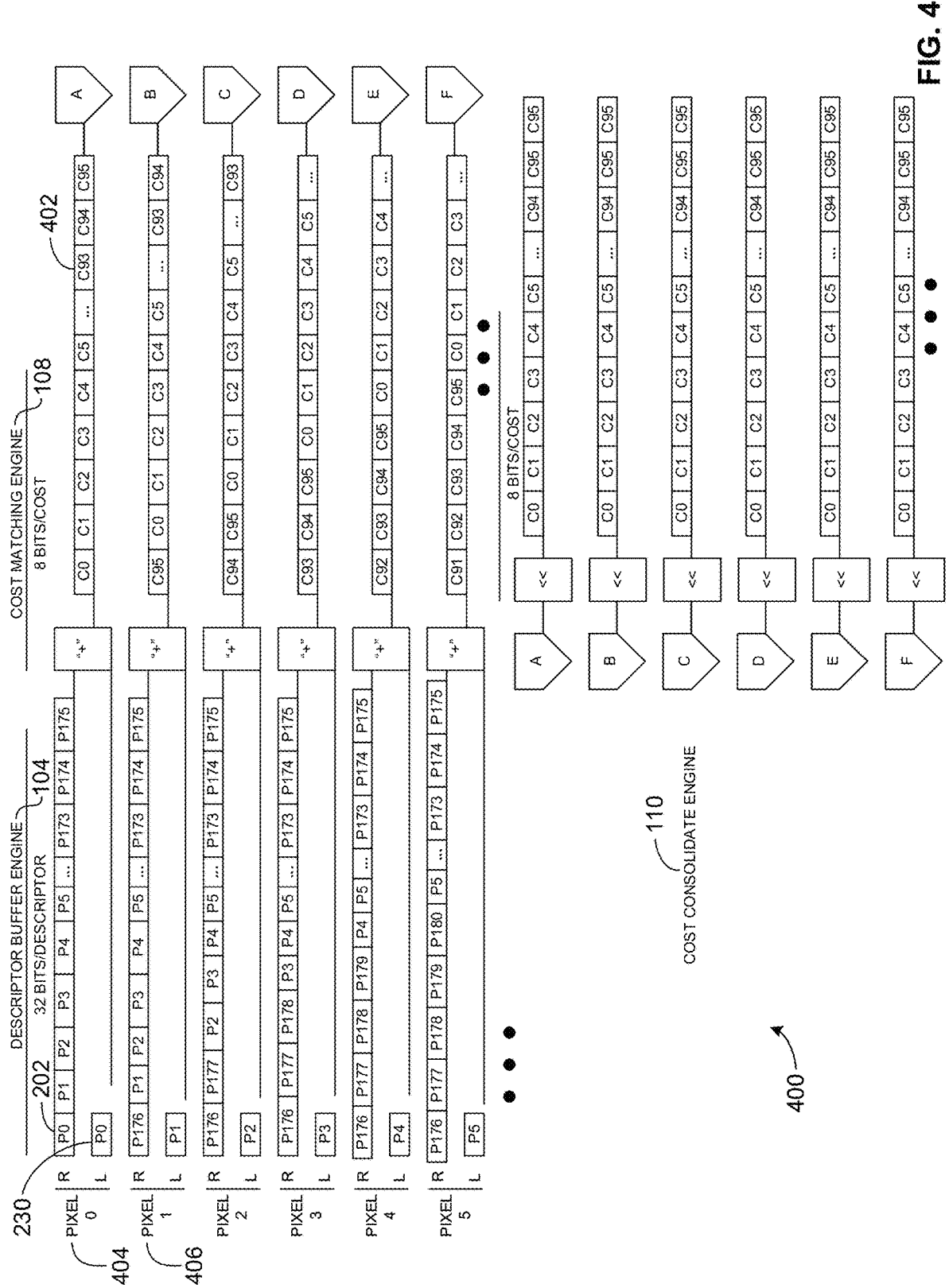
FIG. 4 is a schematic illustration of an example correlation operation performed by the example descriptor buffer engine of FIG. 2A, the example cost matching engine of FIG. 2C, and the example cost consolidation engine of FIG. 2D.

FIG. 4 is a schematic illustration of an example correlation operation 400 performed by the example descriptor buffer engine 104, the example cost matching engine 108, and the example cost consolidation engine 110 of FIG. 1. In the illustrated example of FIG. 4, the correlation operation 400 is split into at least three stages to increase and/or otherwise improve power efficiency. For example, the correlation operation 400 reduces power consumption of the pipeline 114 of FIG. 1 by reducing data movements using circular buffers.

In the illustrated example of FIG. 4 the descriptor buffer engine 104 stores 176 of the right descriptors 202 of FIG. 2A corresponding to pixels included in the right image 120 of FIG. 1 designated by the R row for each pixel being processed. The example descriptor buffer engine 104 stores the example left descriptor 230 corresponding to a pixel included in the left image 118 of FIG. 1 designated by the L row.

In the illustrated example of FIG. 4, the descriptor buffer engine 104 outputs 176 of the right descriptors 234 to the descriptor selector 106 to select 96 of the 176 right descriptors 234. The example descriptor selector 106 outputs the selected 96 right descriptors 234 to the example cost matching engine 108 to calculate matching costs associated with the left descriptor 230 and respective ones of the right descriptors 234. The example cost matching engine 108 of FIG. 4 calculates 96 example costs 402 designated by C0, C1, etc., where each of the 96 costs 402 corresponds to a disparity between one of the right descriptors 234 and the left descriptor 230. For example, the costs 402 can correspond to the disparities 238 of FIG. 2C.

In the illustrated example of FIG. 4, the cost matching engine 108 outputs the 96 costs 402 to the cost consolidation engine 110 to rearrange the costs 402. The example cost consolidation engine 110 organizes the example costs 402 in an order where the newest one of the costs 402 is identified as rank 0 (e.g., the first index) and the oldest one of the costs 402 is identified as rank 95 (e.g., the last index).

The example correlation operation 400 of FIG. 4 represents a plurality of pixels included in the left image 118 of FIG. 1 being processed (e.g., iteratively processed). For example, the correlation operation 400 depicts a first example pixel (PIXEL 0) 404 being processed. The first example pixel 404 can correspond to the example left pixel 124 of FIG. 1. The example descriptor buffer engine 104 loads 176 of the right descriptors 234 and the left descriptor 230 into the example circular buffer 232 of FIG. 2B. The example descriptor selector 106 selects 96 of the 176 right descriptors 234, the example cost matching engine 108 calculates 96 example costs 402 associated with the 96 selected right descriptors 234, and the example cost consolidation engine 110 rearranges the 96 costs 402.

In response to processing the first example pixel 404, the example correlation operation 400 processes a second example pixel (PIXEL 1) 406, during which the example descriptor buffer engine 104 replaces the example right descriptor 234 associated with the first example pixel 404 with the right descriptor 234 associated with an adjacent pixel while maintaining the remaining right descriptors 234 to reduce data movements and, thus, reduce power consumption of the example pipeline 114 of FIG. 1. For example, the descriptor buffer engine 104 can replace a left-most pixel included in the pixel kernel 128 of FIG. 1 with an adjacent pixel (e.g., the next pixel to the right of the pixel kernel 128) when the window encompassing the pixel kernel 128 is moved to the right by one index. The example descriptor buffer engine 104 outputs the 176 example right descriptors 234 including the right descriptor 234 of the adjacent pixel to the example descriptor selector 106, which selects 96 of the 176 right descriptors 234 to the example cost matching engine 108. The example cost matching engine 108 calculates 96 of the example costs 402 by replacing the first one of the costs 402 (C0) with a new cost (C95) associated with the adjacent pixel in the right image 120. The example correlation operation 400 performs the above operations for a plurality of pixels (e.g., PIXEL 2, PIXEL 3, etc.).

Figure 5:
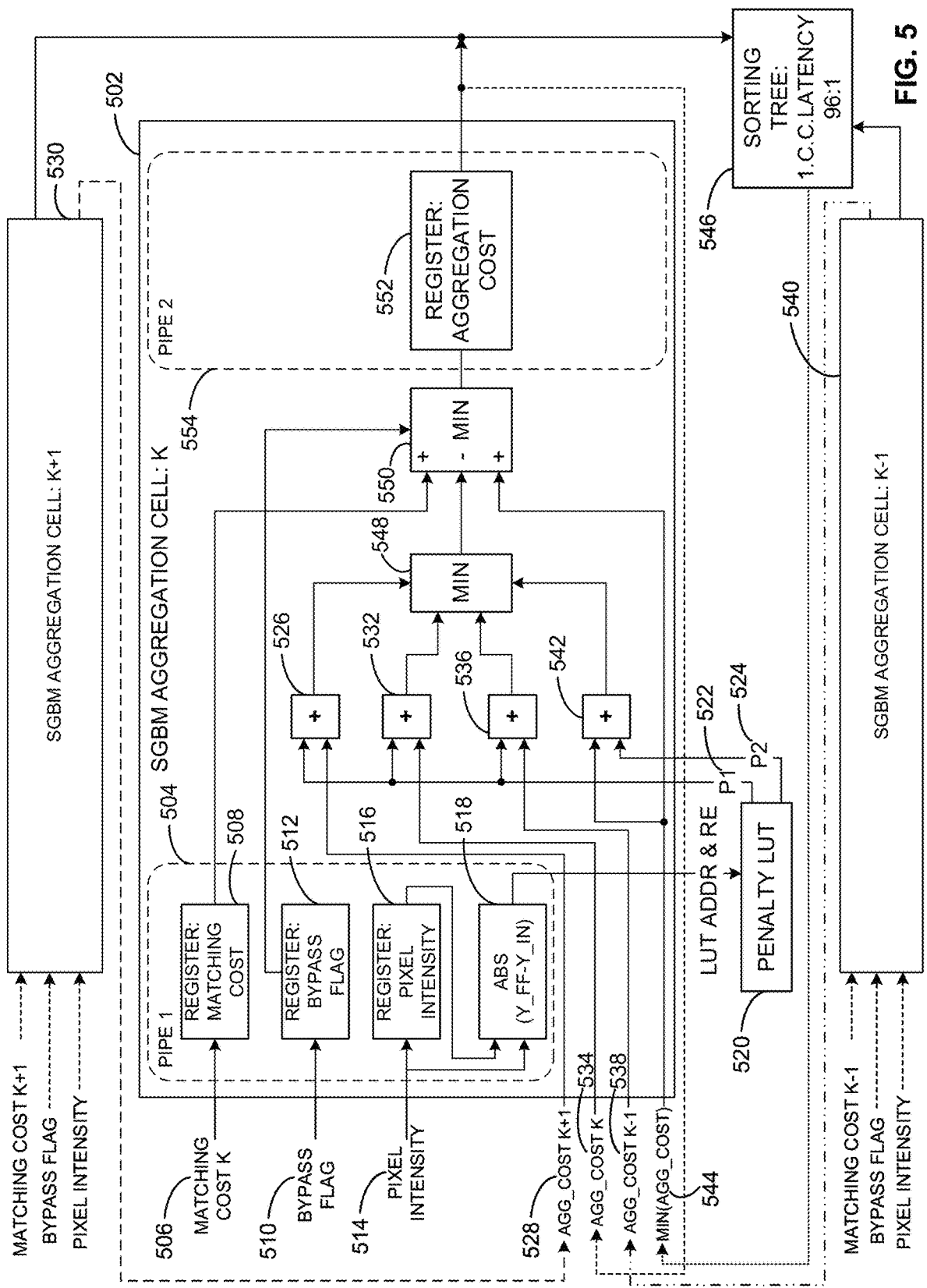
FIG. 5 is a schematic illustration of an example SGBM aggregation cell.

FIG. 5 is a schematic illustration of an example SGBM aggregation cell (K) 502 of FIG. 2E. The example SGBM aggregation cell 502 is a first example SGBM aggregation cell. In the illustrated example of FIG. 5, the first SGBM aggregation cell 502 can correspond to one of the cost aggregation cells 252 of FIG. 2E. The first example SGBM aggregation cell 502 of FIG. 5 includes a first example pipe (PIPE 1) 504 (e.g., a pipeline) that retrieves and stores an example matching cost 506 via an example matching cost register 508. The example matching cost register 508 stores a matching cost to be processed and forwarded to the next stage of the first example SGBM aggregation cell 502. For example, the matching cost register 508 can store the 96 bytes disparity of FIG. 2E that are output from the input cost storage 264.

The first example pipe 504 of FIG. 5 retrieves an example bypass flag 510 via an example bypass flag register 512. The example bypass flag 510 is set for a first cost in an image line (e.g., a cost associated with a first pixel in a line of the left image 118 of FIG. 1) per aggregation direction so the first cost will be pushed through the example SGBM aggregation cell 500 unaltered because, as the first cost, there is no previous costs or data to be aggregated with. For subsequent costs in the image line, the example bypass flag 510 is not set.

The first example pipe 504 of FIG. 5 retrieves and stores an example pixel intensity 514 in an example pixel intensity register 516. The example pixel intensity register 516 transmits pixel intensity values to an example absolute difference calculator 518 to calculate a difference between two consecutive pixels (e.g., a current pixel (Y_IN) and a previous pixel (Y_IN). For example, the two consecutive pixels can be the left pixel 124 of FIG. 1 and an adjacent pixel to a right side of the left pixel 124. The example absolute difference calculator 518 transmits the absolute difference to an example penalty look up table (LUT) 520 to map the absolute difference between the consecutive pixels to a first example penalty value (P1) 522 and a second example penalty value (P2) 524.

In operation, the first example SGBM aggregation cell 502 of FIG. 5 calculates a first example sum 526 of a first example aggregated cost 528 calculated by a second example aggregation cell (K+1) 530 and the first example penalty value 522. The first example SGBM aggregation cell 502 of FIG. 5 calculates a second example sum 532 of a second example aggregated cost 534 calculated by the first SGBM aggregation cell 502 and the first example penalty value 522. The first example SGBM aggregation cell 502 of FIG. 5 calculates a third example sum 536 of a third example aggregated cost 538 calculated by a third example SGBM aggregation cell (K−1) 540 and the first example penalty value 522.

The first example SGBM aggregation cell 502 of FIG. 5 calculates a fourth example sum 542 of the second example penalty value 524 and a fourth example aggregated cost 544, where the fourth aggregated cost 544 is a minimum value calculated by an example sorting tree 546. The example sorting tree 546 determines a minimum value out of a plurality of horizontal aggregate costs and/or vertical aggregate costs. For example, the sorting tree 546 can correspond to the vertical minimum cost determiner 278, the horizontal minimum cost determiner 280, and/or a combination thereof. For example, the sorting tree 546 represents hardware and/or machine readable instructions to execute a sort algorithm that builds a binary search tree from the elements to be sorted, and then traverses the tree (in-order) so that the elements come out in sorted order. The example sorting tree 546 facilitates a latency of the example SGBM aggregation cells 502, 530, 540 to be 1 clock cycle by sorting 96 stored costs (e.g., horizontal costs, vertical costs, etc.) into a minimum value corresponding to one of the 96 sorted costs.

In the illustrated example of FIG. 5, each of the example SGBM aggregation cells 502, 530, 540 perform each of the three aggregation paths in two consecutive cycles. For example, during a first cycle, each of the SGBM aggregation cells 502, 530, 540 perform and/or otherwise facilitate the left-to-right aggregation path. During a second cycle, each of the example SGBM aggregation cells 502, 530, 540 perform and/or otherwise facilitate the right-to-left aggregation path and the top-to-bottom aggregation path. Each of the example SGBM aggregate cells 502, 530, 540 is responsible for aggregating one of the 96 disparities or cost sets for one pixel.

In the illustrated example of FIG. 5, the first through four aggregate costs 528, 534, 538, 544 represent a method of improving the quality of correlation-costs per pixel from their initial values outputted by the cost matching engine 108 of FIG. 1 by propagating trends from neighboring pixels in aggregate directions or paths. For example, the first aggregate cost 528 can correspond to a first horizontal path of left-to-right, where the first horizontal path represents processing pixels in the left image 118 of FIG. 1 from left-to-right, where the pixels (e.g., the matching costs of the pixels) on the right are influenced by the result of previous aggregation of their left neighbor. For a path r, the example SGBM aggregation cell 502 can calculate a matching cost beginning with a pixel at the edge of an image and ending with the pixel of interest. For example, for a left-to-right path of the right image 120 of FIG. 1, the SGBM aggregation cell 502 determines a matching cost for each pixel in the path starting from a first pixel at the left edge of the right image 120 to the central pixel 126 of the right image 120.

In other examples, the third aggregate cost 538 can correspond to a second horizontal path of right to-left, where the second horizontal path represents processing pixels in the left image 118 of FIG. 1 from right-to-left, where the pixels (e.g., the matching costs of the pixels) on the left are influenced by the result of previous aggregation of their right neighbor. For example, for a right-to-left path of the right image 120 of FIG. 1, the SGBM aggregation cell 502 determines a matching cost for each pixel in the path starting from a first pixel at the right edge of the right image 120 to the central pixel 126 of the right image 120.

In the illustrated example of FIG. 5, a first example minimum function 548 determines a first minimum value of the first through fourth sums 526, 532, 536, 542. The example SGBM aggregation cell 502 includes a second example minimum function 550 to determine a second minimum value out of a difference between (1) a sum of the example matching cost K 506 and the fourth example aggregate cost 544 and (2) the first minimum value. For example, the second minimum function 550 determines whether a matching cost associated with a current pixel (e.g., the left pixel 124 of FIG. 1) is a minimum disparity. For example, each of the SGBM aggregation cells 502, 530, 540 execute and/or otherwise implement the examples of Equation (5) and/or (6) above via the first minimum function 548 and the second minimum function 550.

The second example minimum function 550 of the illustrated example of FIG. 5 outputs the second minimum value to an example aggregation cost register 552 included in a second example pipe (PIPE 2) 554 to store the second minimum value. Although the description in connection in FIG. 5 is directed to the first example SGBM aggregation cell 502, the description is also applicable to the second and third example SGBM aggregation cells 530, 540. For example, the second and third SGBM aggregation cells 530, 540 include substantially similar components (e.g., a portion or an entirety of the components) and perform substantially the same functions (e.g., a portion or an entirety of the functions) as the first SGBM aggregation cell 502.

Figure 6:
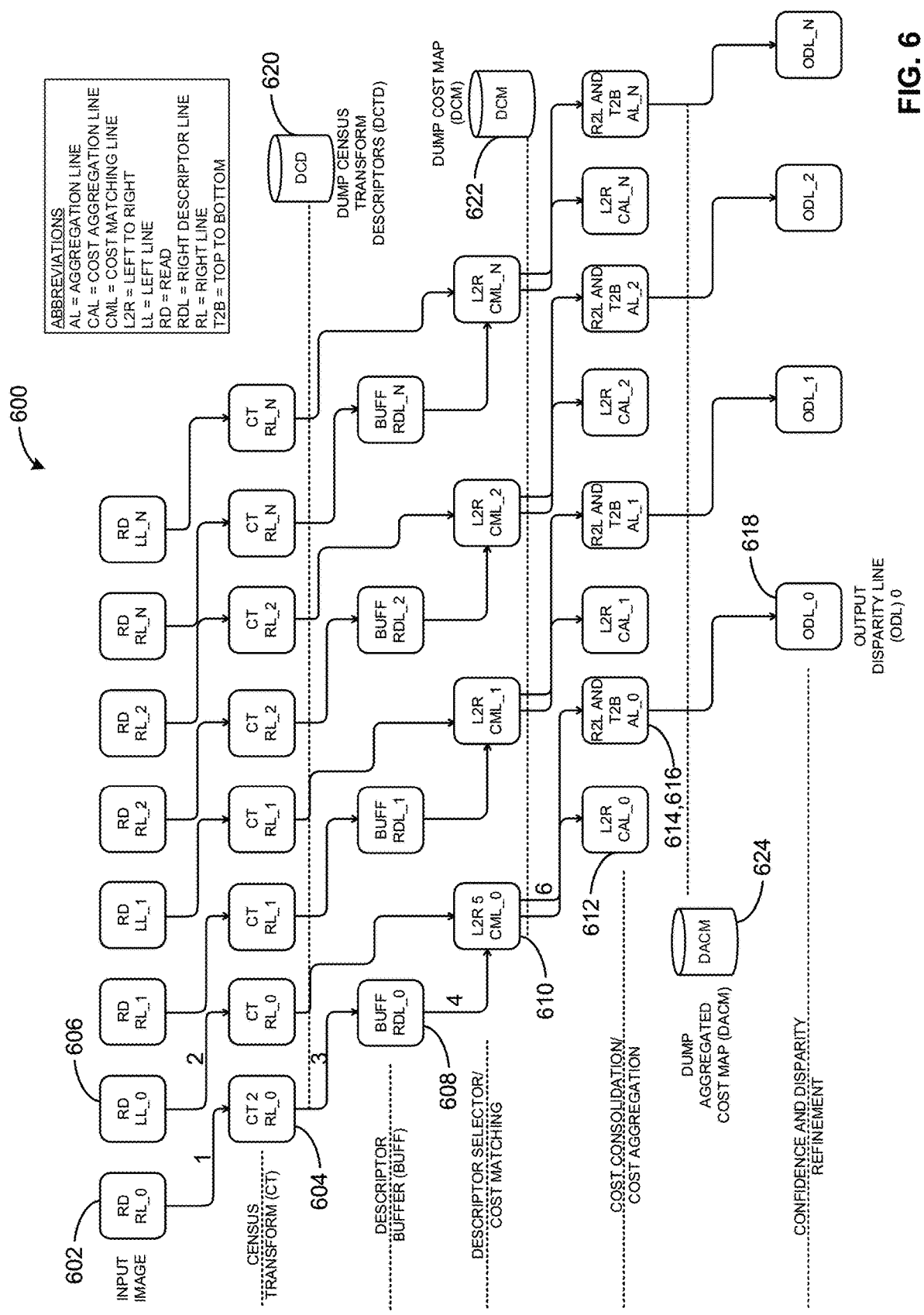
FIG. 6 is a schematic illustration of an example stereo pipeline data flow to implement the examples disclosed herein.

FIG. 6 is a schematic illustration of an example stereo pipeline data flow 600 to implement the examples disclosed herein. During a first time instance, the example CT engine 102 of FIG. 1 reads a first right line (RL_0) 602. During a second time instance, the example CT engine 102 generates a first CT (CT RL_0) 604 of the first right line 602. For example, the CT engine 102 generates the right descriptor 202 of FIG. 1. During the second time instance, the example CT engine 102 reads a first left line (LL_0) 606. During a third time instance, the example descriptor buffer engine 104 of FIG. 1 reads and stores the first CT 604 into the example circular buffer 232 of FIG. 2B to be stored as a first example right descriptor line (BUFF RDL_0) 608.

During a fourth time instance, the example descriptor buffer engine 104 transmits the first example right descriptor line 608 to the example descriptor selector 106 and/or the example cost matching engine 108. During the fourth time instance, the example cost matching engine 108 obtains the first left line 606 to perform a cost matching operation. During a fifth time instance, the example cost matching engine 108 generates a first example left-to-right cost matching line (L2R CML_0) 610.

During a sixth time instance, the example cost matching engine 108 transmits the first left-to-right cost matching line 610 to the example cost consolidation engine 110 to sort image data including the first left-to-right cost matching line 610. During a seventh time instance, the example cost consolidation engine 110 transmits the sorted image data to the SGBM aggregation engine 112 of FIG. 1 to determine a first example left-to-right cost aggregation line (L2R CAL_0) 612, a first example right-to-left aggregation line (R2L AL_0) 614 and a first example top-to-bottom aggregation line (T2B AL_0) 616. During an eighth time instance, the example SGBM aggregation engine 112 generates a first example output disparity line (ODL_0) 618.

In response to generating output disparity lines for each line of the input image (e.g., the left image 118 of FIG. 1), the example pipeline data flow 600 includes dumping census transform descriptors (DCTD) 620, dumping a cost map (DCM) 622, and dumping an aggregated cost map (DACM) 624. The example pipeline data flow 600 concludes when output disparity lines are determined for each line of the input image. For example, the pipeline 114 of FIG. 1 can perform stereo matching of pixels included in the left image 118 of FIG. 1 and pixels included in the right image 120 of FIG. 1 based on the output disparity lines.

Figure 7:
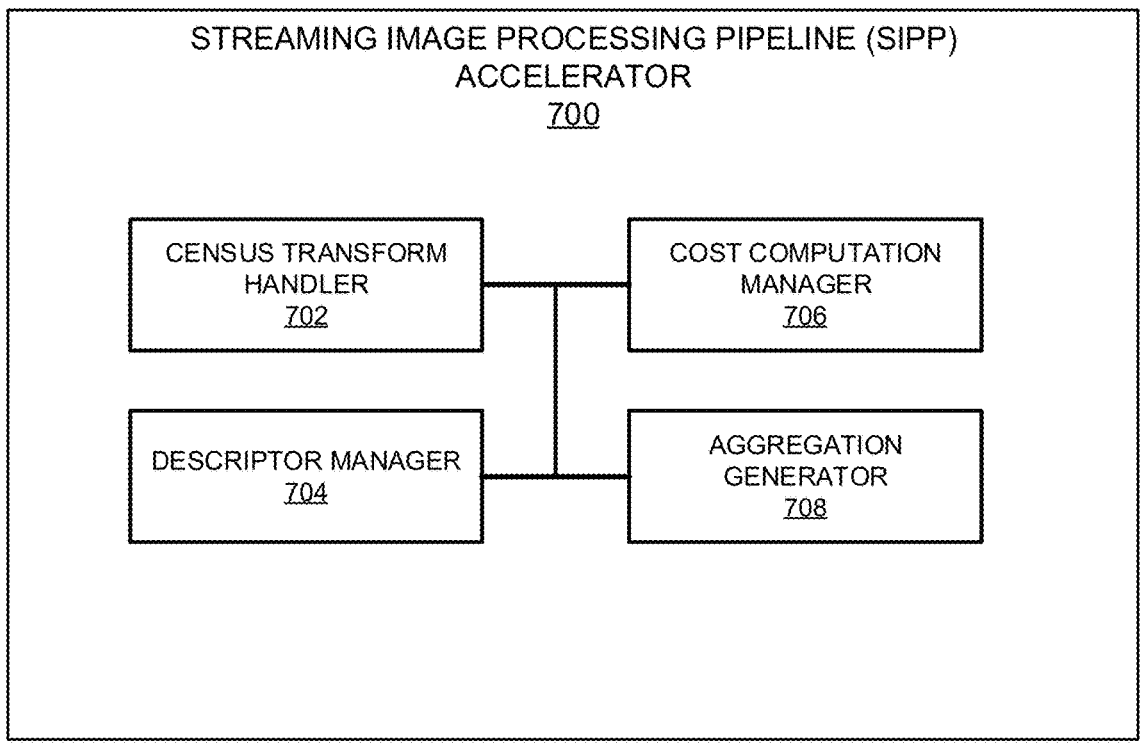
FIG. 7 is a block diagram of an example implementation of an example SIPP accelerator 700.

FIG. 7 is a block diagram of an example implementation of an example SIPP accelerator 700. The example SIPP accelerator 700 performs an image processing operation such as stereo matching. For example, the SIPP accelerator 700 can estimate and/or otherwise determine a 3D model of an environment, a scene, etc., by taking two or images (e.g., photographs, video frames, etc.) and identifying matching pixels in the two or more images and converting 2D positions of the pixels into 3D depths. For example, the SIPP accelerator 700 can estimate the relative depth of points in the environment with a stereo disparity map, which is constructed by matching corresponding points in the two or more images (e.g., a stereo pair of images). The example SIPP accelerator 700 accelerates and/or otherwise increases a speed of a disparity computation from aligned images that have corresponding substantially large throughput.

In the illustrated example of FIG. 7, the SIPP accelerator 700 includes an example census transform handler 702, an example descriptor manager 704, an example cost computation manager 706, and an example aggregation generator. The example SIPP accelerator 700 of FIG. 7 includes the example census transform handler 702 to perform and/or otherwise facilitate a census transform operation. For example, the census transform handler 702 can correspond and/or otherwise implement the CT engine 102 of FIG. 1. The example census transform handler 702 includes means to retrieve pixel values associated with pixels of a pixel kernel or evaluation window included in an input image, compare the pixel values to a pixel value of a central pixel, a threshold value, an average value, etc., and generate descriptors based on the comparison.

In some examples, the census transform handler 702 generates a 25-bit pre-mask bit descriptor (e.g., the pre-mask bit descriptor 222 of FIG. 2A) based on comparing pixels of a 5×5 pixel kernel to a comparison value. In other examples, the census transform handler 702 generates a 49-bit pre-mask bit descriptor based on a 7×7 kernel, a 63-bit pre-mask bit descriptor based on a 7×9 kernel, etc. The example census transform handler 702 applies zero latency, random bit concatenation logic to the pre-mask bit descriptor to generate a post-mask bit descriptor (e.g., the post-mask bit descriptor 202 of FIG. 2A). For example, the census transform handler 702 can implement the concatenation logic 224 of FIGS. 2A and/or 3 to generate the post-mask bit descriptor.

The example SIPP accelerator 700 of FIG. 7 includes the example descriptor manager 704 to handle and/or otherwise prepare a descriptor (e.g., the post-mask bit descriptor 202 of FIG. 2A) for a cost correlation operation. For example, the descriptor manager 704 can correspond and/or otherwise implement at least one of the descriptor buffer engine 104 or the descriptor selector 106 of FIG. 1. The example descriptor manager 704 includes means to retrieve one or more post-mask bit descriptors generated by the example census transform handler 702 and select one or more of the post-mask bit descriptors based on companding logic. For example, the descriptor manager 704 can retrieve a post-mask bit descriptor generated by the census transform handler 702, store the post-mask bit descriptor in a circular manner via one or more circular buffers, and select a subset of the stored post-mask bit descriptors based on companding logic.

The example SIPP accelerator 700 of FIG. 7 includes the example cost computation manager 706 to generate and/or otherwise determine matching costs corresponding to a difference in image locations of pixels included in different images. For example, the cost computation manager 706 can correspond and/or otherwise implement at least one of the cost matching engine 108 or the cost consolidation engine 110 of FIG. 1. The example cost computation manager 706 includes means to retrieve a first descriptor associated with a first pixel of a first image (e.g., the example left descriptor 230 of FIG. 2C) and descriptors associated with second pixels of a second image (e.g., the 96 right descriptors 234 of FIG. 2C) and determine at least one of a pixel intensity value of the first pixel or disparities associated with the first pixel. For example, the cost computation manager 706 can calculate a disparity by evaluating and/or otherwise executing at least one of Equation (4) or Equation (5) above.

In some examples, the cost computation manager 706 determines a plurality of disparities for each pixel of interest. For example, the cost computation manager 706 can select the left pixel 124 of FIG. 1 to process. The example cost computation manager 706 selects the pixel kernel 128 of FIG. 1 to process. The example cost computation manager 706 calculates a disparity for each one of the pixels included in the pixel kernel 128 with respect to the left pixel 124. In response to calculating the disparities, the example cost computation manager 706 can select another pixel kernel of the example right image 120 to process. For example, the cost computation manager 706 can process pixel kernels of the right image 120 until an entirety of the right image 120 has been processed.

The example SIPP accelerator 700 of FIG. 7 includes the example aggregation generator 708 to generate a disparity map including one or more disparities and determine a minimum disparity based on the disparity map, where the minimum disparity corresponds to a difference in coordinates (e.g., horizontal coordinates, vertical coordinates, etc., and/or a combination thereof) between pixels in different images. The example aggregation generator 708 includes means to determine aggregate costs associated with one or more propagation paths, generate a disparity map based on the aggregate costs, and/or identify a matching one of the pixels in the example right image 120 of FIG. 1 to the example left image 118 based on at least one of the aggregate cost(s), one or more of the disparities, or the disparity map.

In some examples, the aggregation generator 708 calculates a first aggregated cost associated with a first propagation path corresponding to a left-to-right input path from the second pixel to the first pixel. The example aggregation generator 708 calculates a second aggregated cost associated with a second propagation path corresponding to a right-to-left input path from the second pixel to the first pixel. The example aggregation generator 708 calculates a third aggregated cost associated with a third propagation path corresponding to a top-to-bottom input path from the second pixel to the first pixel. In response to determining the first, second, and third aggregated costs, the example aggregation generator 708 determines a minimum value out of the first through third aggregated costs and generates a disparity map for a plurality of pixels to match pixels in different images of a stereo image pair.

The example census transform handler means, the example descriptor manager means, the example cost computation manager means, and/or the aggregation generator means of the illustrated example of FIG. 7 is/are implemented by software executing on a hardware processor. Additionally or alternatively, the example census transform handler means, the example descriptor manager means, the example cost computation manager means, and/or the aggregation generator means could instead be implemented by a logic circuit structured to perform logic operations to achieve the desired functionality, such as an ASIC, an FPGA, or the like and/or a combination of such circuits and software and/or firmware.

While an example manner of implementing the example SIPP accelerator 700 of FIG. 7 is illustrated in FIG. 7, one or more of the elements, processes, and/or devices illustrated in FIG. 7 may be combined, divided, re-arranged, omitted, eliminated, and/or implemented in any other way. Further, the example census transform handler 702, the example descriptor manager 704, the example cost computation manager 706, the example aggregation generator 708, and/or, more generally, the example SIPP accelerator 700 of FIG. 7 may be implemented by hardware, software, firmware, and/or any combination of hardware, software, and/or firmware. Thus, for example, any of the example census transform handler 702, the example descriptor manager 704, the example cost computation manager 706, the example aggregation generator 708, and/or, more generally, the example SIPP accelerator 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example census transform handler 702, the example descriptor manager 704, the example cost computation manager 706, and/or the example aggregation generator 708 is/are hereby expressly defined to include a non-transitory computer readable storage device or storage disk such as a memory, a digital versatile disk (DVD), a compact disk (CD), a Blu-ray disk, etc., including the software and/or firmware. Further still, the example SIPP accelerator 700 of FIG. 7 may include one or more elements, processes, and/or devices in addition to, or instead of, those illustrated in FIG. 7, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
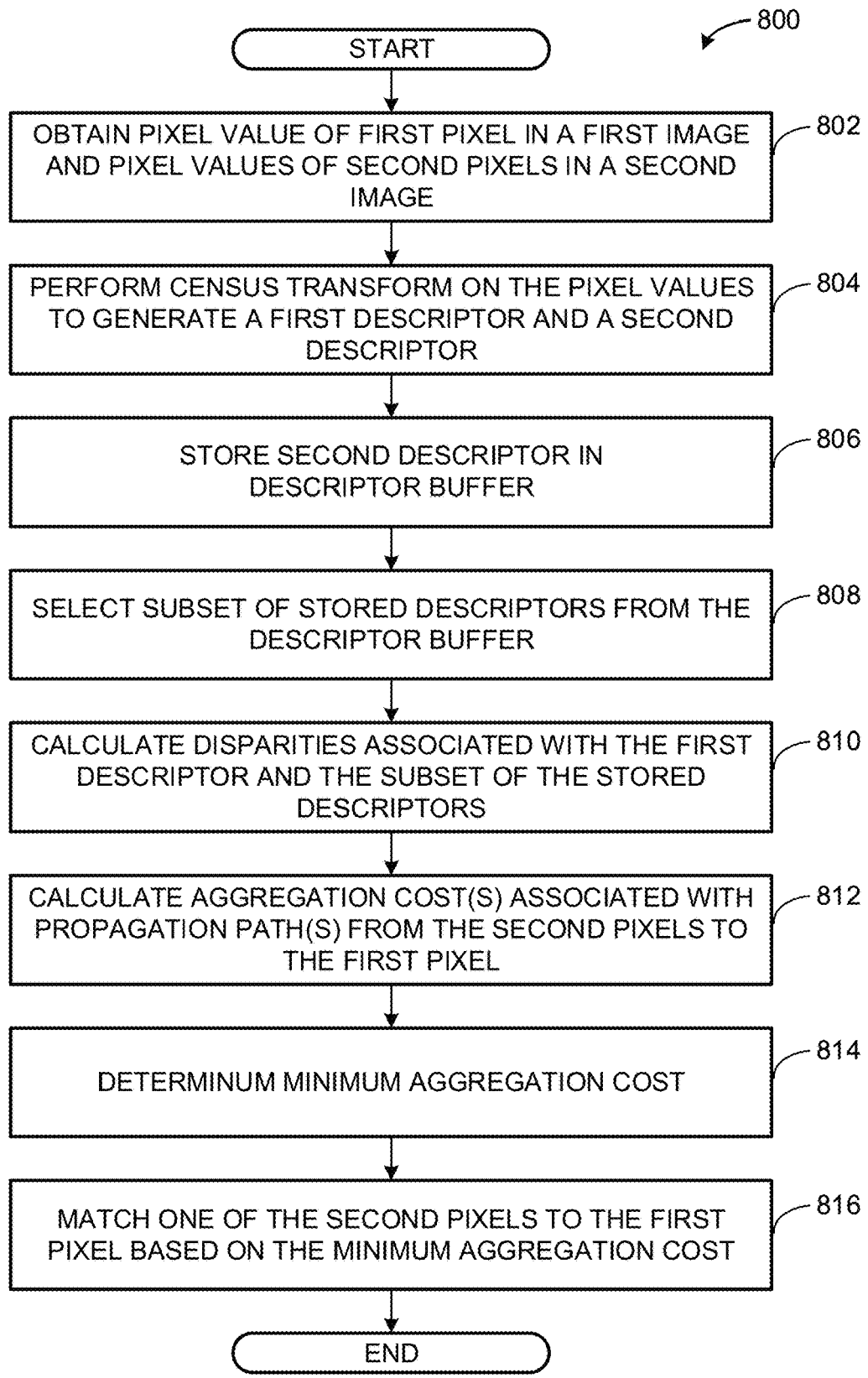
FIG. 8 is a flowchart representative of example machine readable instructions that may be executed to implement the example pipeline optimization system of FIG. 1 and/or the example SIPP accelerator of FIG. 7 to accelerate an image feature matching operation.

Flowcharts representative of example hardware logic, machine readable instructions, hardware implemented state machines, and/or any combination thereof for implementing the example SIPP accelerator 700 of FIG. 7 is shown in FIGS. 8-10. The machine readable instructions may be an executable program or portion of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 8-10, many other methods of implementing the example SIPP accelerator 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 8-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 8 is a flowchart representative of example machine readable instructions 800 that may be executed to implement the example pipeline optimization system 100 of FIG. 1 and/or the example SIPP accelerator 700 of FIG. 7 to accelerate an image feature matching operation. The example machine readable instructions 800 of FIG. 8 begin at block 802, at which the example SIPP accelerator 700 obtains a pixel value of a first pixel in a first image and pixel values of second pixels in a second image. For example, the census transform handler 702 of FIG. 7 can obtain a pixel intensity value of the left pixel 124 of the left image 118 and pixel intensity values of pixels of the pixel kernel 128 of the right image 120 of FIG. 1.

At block 804, the example SIPP accelerator 700 performs a census transform on the pixel values to generate a first descriptor and a second descriptor. For example, the census transform handler 702 can compare pixel values of neighboring pixels (e.g., within a pixel kernel) of the left pixel 124 to a pixel value of the left pixel 124 to generate the left descriptor 230 of FIG. 2B. In other examples, the census transform handler 702 compares pixel values of the pixel kernel 128 of FIG. 1 to a comparison value such as, but not limited to, a pixel value of the central pixel 126, an average value of pixel values of the pixel kernel 128, a threshold value, etc., to generate the pre-mask bit descriptor 222 of FIG. 2A. In such examples, the census transform handler 702 applies the concatenation mask 228 of FIG. 2A and the concatenation logic 224 of FIG. 2A to the pre-mask bit descriptor 222 to generate the post-mask bit descriptor 202 of FIG. 2A. The example post-mask bit descriptor 202 can characterize an image feature associated with the pixel kernel 128 based on a comparison of the pixel intensity values of the pixels included in the pixel kernel 128 to a comparison value. For example, the post-mask bit descriptor 202 can correspond to a right descriptor associated with a pixel of the right image 120.

At block 806, the example SIPP accelerator 700 stores the second descriptor in the descriptor buffer. For example, the descriptor manager 704 can store the right descriptor 202 in the circular buffer 232 of FIG. 2B. The example descriptor manager 704 can read and output 176 of the right descriptors 202 from the example circular buffer 232.

At block 808, the example SIPP accelerator 700 selects a subset of stored descriptors from the descriptor buffer. For example, the descriptor manager 704 can select 96 of the 176 right descriptors 202 based on companding logic.

At block 810, the example SIPP accelerator 700 calculates disparities associated with the first descriptor and the subset of the stored descriptors. For example, the cost computation manager 706 can calculate 96 disparities associated with the left descriptor 230 and respective ones of the 96 selected right descriptors 202.

At block 812, the example SIPP accelerator 700 calculates aggregation cost(s) associated with propagation path(s) from the second pixels to the first pixel. For example, the aggregation generator 708 can calculate a first aggregation cost associated with a left-to-right propagation path, a second aggregation cost associated with a right-to-left propagation path, and a third aggregation cost associated with a top-to-bottom propagation path.

At block 814, the example SIPP accelerator 700 determines a minimum aggregation cost. For example, the aggregation generator 708 determines a minimum aggregation cost out of the first, second, and third aggregation costs. For example, the aggregation generator 708 determines the minimum aggregation cost for each disparity (e.g., for each of the 96 disparities 238) calculated for the example left pixel 124.

At block 816, the example SIPP accelerator 700 matches one of the second pixels to the first pixel based on the minimum aggregation cost. For example, the aggregation generator 708 generates a disparity map (e.g., a two-dimensional vector of 64 or 96 matching costs per pixel) based on the minimum aggregation cost for each of the 96 disparities. In such examples, the aggregation generator 708 determines a minimum disparity based on the disparity map. The example aggregation generator 708 can identify a matching pixel in the right image 120 to the example left pixel 124 based on the minimum disparity. For example, the aggregation generator 708 can determine that one of the pixels included in the pixel kernel 128 of FIG. 1 has a first position in the right image 120 that substantially matches (e.g., matches within a tolerance threshold) a second position of the left pixel 124 in the left image 118 based on the minimum aggregation cost. In response to the matching, the example machine readable instructions 800 of FIG. 8 conclude. For example, the example SIPP accelerator 700 can determine to match another pixel in the left image 118 to one of the pixels included in the right image 120 of FIG. 1.

FIG. 9 depicts example source code 900 representative of example computer readable instructions that may be executed to implement the example pipeline optimization system 100 of FIG. 1 and/or the example SIPP accelerator 700 of FIG. 7 to determine a disparity with a minimum cost associated with a first pixel in a first image and a second pixel in a second image. The example source code 900 of FIG. 9 can be implemented and/or otherwise executed by at least one of the SGBM aggregation engine 112 of FIG. 1, the example cost aggregation cells 252 of FIG. 2E, the example SGBM aggregation cells 502, 530, 540 of FIG. 5, or the aggregation generator 708 of FIG. 7.

For example, the aggregation generator 708 executes the source code 900 of FIG. 9 for each pixel in a line of an input image (e.g., the left image 118 of FIG. 1, the right image 120 of FIG. 1, etc.). The example source code 900 of FIG. 9 processes image data from an input cost buffer (ICB) and a partial cost buffer (PCB). For example, the ICB can correspond to the input cost buffer 250 of FIG. 2E. The example PCB can correspond to the example aggregation cost register 552 of FIG. 5.

In the example source code 900 of FIG. 9, for each pixel in the line, the example aggregation generator 708 determines an updated path cost (PathCostNew[n][x]) for three paths, where the three paths are left-to-right corresponding to n=0, top-to-bottom corresponding to n=1, and right-to-left corresponding to n=2. In the example source code 900 of FIG. 9, PathCostNew is a 3D array indexed by path (n), pixel (x), and disparity (d) (e.g., PathCostNew[0] [x] [d]). The example aggregation generator 708 calculates a sum for each path into an aggregated cost (AGV). In the example source code 900 of FIG. 9, AGV is a 2D array of aggregate costs indexed by pixel and disparity. In response to calculating the aggregate cost for each disparity, the example aggregation generator 708 determines and/or otherwise identifies the disparity with a minimum cost value and stores the path costs for each of the paths in a temporary buffer or memory.

FIG. 10 depicts example source code 1000 representative of example computer readable instructions that may be executed to implement the example pipeline optimization system 100 of FIG. 1 and/or the example SIPP accelerator 700 of FIG. 7 to determine a cost associated with a propagation path. The example source code 1000 of FIG. 10 can be implemented and/or otherwise executed by at least one of the SGBM aggregation engine 112 of FIG. 1, the example cost aggregation cells 252 of FIG. 2E, the example SGBM aggregation cells 502, 530, 540 of FIG. 5, or the aggregation generator 708 of FIG. 7.

For example, the aggregation generator 708 determines a minimum cost (MIN_2) of an instant or current pixel (x) over all disparities associated with the current pixel. For example, the aggregation generator 708 can determine a minimum disparity value of the 96 disparities calculated for and/or otherwise associated with the left pixel 124 of FIG. 1. The example aggregation generator 708 maps a difference (intensityDiff) between intensity values of the current pixel and a previous pixel to a first penalty value (P1) and a second penalty value (P2). The example aggregation generator 708 determines the new cost for each disparity. The example aggregation generator 708 determines the new cost by determining (e.g., iteratively determining) if a selected disparity plus the first penalty value is less than a current cost. In response to determining that the selected disparity plus the first penalty value is less than the current cost, then the current cost is set to the selected disparity plus the first penalty value.

Figure 11:
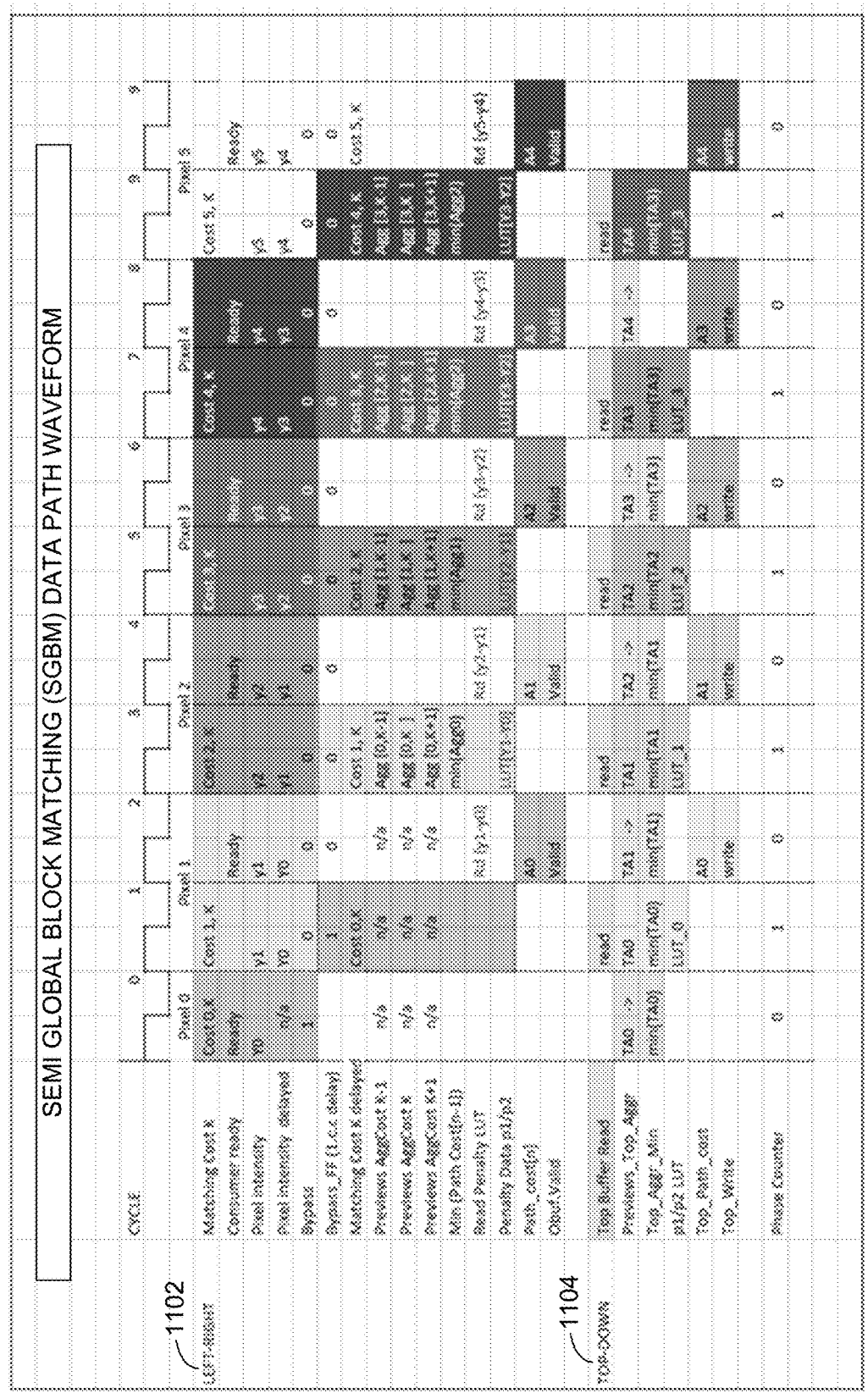
FIG. 11 depicts an example timing diagram.

FIG. 11 depicts an example timing diagram 1100 corresponding to an example data path waveform of the example SGBM aggregation engine 112 of FIG. 1 and/or the example aggregation generator 708 of FIG. 7. The example timing diagram 1100 depicts operations associated with first example path 1102 corresponding to a left-to-right path and a second example path 1104 corresponding to a top-down or a top-to-bottom path.

In the example timing diagram 1100 of FIG. 11, the example SGBM aggregation engine 112 and/or the example aggregation generator 708 achieves a 1 path cost set (e.g., a set of 64 aggregated costs per path, a set of 96 aggregated costs per path, etc.) per 2 clock cycle throughput. For example, the SGBM aggregation engine 112 can process 96 disparities associated with a pixel for a given aggregation path every 2 clock cycles. For example, in the first path 1102, during a first clock cycle (CYCLE 0), the SGBM aggregation engine 112 obtains a first set of matching costs (Matching Cost K=Cost 0, K) (e.g., 96 costs determined by the example cost matching engine 108 of FIG. 1) of a first pixel, a first pixel intensity value (Y0) of the first pixel, and a bypass value of 1. The bypass value is set in the first clock cycle because in a left-to-right movement, the left-most pixel does not have previously aggregated data. During a second clock cycle (CYCLE1), the SGBM aggregation engine 112 obtains a second set of matching costs (Matching Cost K=Cost 1) of a second pixel, a second pixel intensity value (Y1) of the second pixel, and a pixel intensity delayed register is set to the first pixel intensity value (Y0) obtained during the first clock cycle. During a third clock cycle (CYCLE 2), the example SGBM aggregation engine 112 maps a difference of the first pixel intensity value and the second pixel intensity value to a penalty value (Read Penalty LUT). During the third clock cycle, the example SGBM aggregation engine 112 calculates a first path cost set (Path_cost[n]) of A0 and validates the first path cost set. For example, the SGBM aggregation engine 112 during the second clock cycle and the third clock cycle calculates an aggregated cost for a path of interest for a pixel based on processing 96 costs associated with the pixel.

In the example timing diagram 1100 of FIG. 11, in the second path 1104, during a first clock cycle (CYCLE 0), the example SGBM aggregation engine 112 obtains a first aggregate cost (Previews_Top_Aggr) of TA0 and determines a first minimum aggregate cost (Top_Aggr_Min) of min(TA0). During a second clock cycle (CYCLE 1), the example SGBM aggregation engine 112 determines a first penalty value (p1/p2 LUT) of LUT_0. During a third clock cycle (CYCLE 2), the example SGBM aggregation engine 112 obtains a second aggregate cost of TA1 and determines a second minimum aggregate cost of min(TA1). During the third clock cycle, the example SGBM aggregation engine 112 determines a first path cost of A0 and writes the path cost to an output buffer. The example SGBM aggregation engine 112 processes (e.g., iteratively processes) aggregate cost associated with pixels of an input image to achieve a 2 clock cycle to 1 path cost set throughput (e.g., a set of 64 aggregated costs for a path, a set of 96 aggregated costs for a path, etc.).

Figure 12:
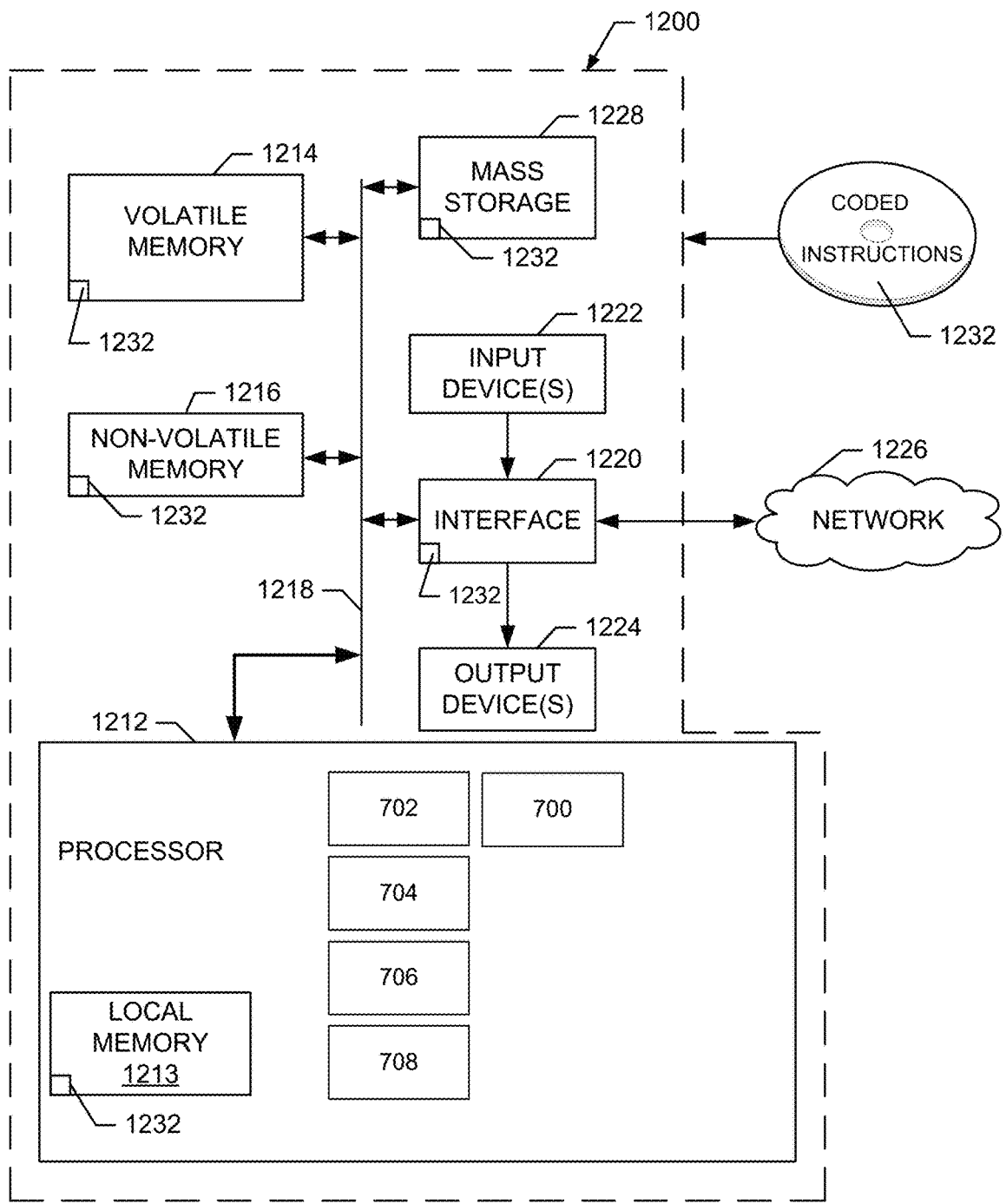
FIG. 12 is a block diagram of an example processor platform structured to execute the example machine readable instructions of FIGS. 8-10 to implement the example pipeline optimization system of FIG. 1 and/or the example SIPP accelerator of FIG. 7.

FIG. 12 is a block diagram of an example processor platform 1200 structured to execute the instructions of FIGS. 8-10 to implement the example SIPP accelerator 700 of FIG. 7. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1212 implements the example SIPP accelerator 700, the example census transform handler 702, the example descriptor manager 704, the example cost computation manager 706, the example aggregation generator 708.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 8-10 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus and articles of manufacture have been disclosed that optimize pipeline execution. Examples disclosed herein perform stereo matching using a pipeline optimization system including one or more pipeline components to facilitate the determination of disparity and/or path costs associated with matching pixels in stereo images. Examples disclosed herein facilitate an architecture that processes and/or otherwise facilitates census transform functions of 1 pixel per 1 clock cycle throughput. Examples disclosed herein reduce power consumption of resources by reducing data movements by using a circular buffer schema in one or more disclosed buffers or storage constructs. Examples disclosed herein generate a stereo disparity map constructed by matching corresponding points in the stereo pair using an architecture that accelerates disparity computations associated with pixels included in stereo images.

Example 1 includes an apparatus to perform stereo matching, the apparatus comprising a cost computation manager to determine a value associated with a first location of a first pixel of a first image and a second location of a second pixel of a second image by calculating a matching cost between the first location and the second location, and an aggregation generator to generate a disparity map including the value, and determine a minimum value based on the disparity map corresponding to a difference in horizontal coordinates between the first location and the second location.

Example 2 includes the apparatus of example 1, further including a census transform handler to generate a bit descriptor that maps intensity values of a set of pixels of a pixel kernel including the second pixel to a bit string.

Example 3 includes the apparatus of example 2, wherein the census transform handler is to generate the bit string by comparing the intensity values of the set of pixels to an intensity value of a central pixel of the pixel kernel, an average value of the intensity values, or a threshold value.

Example 4 includes the apparatus of example 2, wherein the bit descriptor is a post-mask bit descriptor, the census transform handler to generate the bit string by applying a concatenation mask and one or more sorting trees to a pre-mask bit descriptor to generate the post-mask bit descriptor.

Example 5 includes the apparatus of example 2, wherein the bit descriptor is a first bit descriptor, the cost computation manager to determine the disparity by calculating an absolute difference between a first pixel intensity value of the first pixel and a second pixel intensity value of the second pixel, calculating a hamming distance between the first bit descriptor of the first pixel and a second bit descriptor of the second pixel, calculating a sum of the absolute difference and the hamming distance, and determining the disparity by clamping the sum to an integer.

Example 6 includes the apparatus of example 1, wherein the matching cost is a first matching cost, the cost computation manager to rearrange matching costs including the first matching cost using barrel shifters.

Example 7 includes the apparatus of example 1, wherein the aggregation generator is to calculate a first aggregated cost associated with a first propagation path corresponding to a left-to-right input path from the second pixel to the first pixel, calculate a second aggregated cost associated with a second propagation path corresponding to a right-to-left input path from the second pixel to the first pixel, calculate a third aggregated cost associated with a third propagation path corresponding to a top-to-bottom input path from the second pixel to the first pixel, and determine the disparity map based on calculating a sum of the first aggregated cost, the second aggregated cost, and the third aggregated cost.

Example 8 includes a non-transitory computer readable storage medium comprising instructions which, when executed, cause a machine to at least determine a value associated with a first location of a first pixel of a first image and a second location of a second pixel of a second image by calculating a matching cost between the first location and the second location, generate a disparity map including the value, and determine a minimum value based on the disparity map corresponding to a difference in horizontal coordinates between the first location and the second location.

Example 9 includes the non-transitory computer readable storage medium of example 8, further including instructions which, when executed, cause the machine to at least generate a bit descriptor that maps intensity values of a set of pixels of a pixel kernel including the second pixel to a bit string.

Example 10 includes the non-transitory computer readable storage medium of example 9, further including instructions which, when executed, cause the machine to at least generate the bit string by comparing the intensity values of the set of pixels to an intensity value of a central pixel of the pixel kernel, an average value of the intensity values, or a threshold value.

Example 11 includes the non-transitory computer readable storage medium of example 9, wherein the bit descriptor is a post-mask bit descriptor, further including instructions which, when executed, cause the machine to at least generate the bit string by applying a concatenation mask and one or more sorting trees to a pre-mask bit descriptor to generate the post-mask bit descriptor.

Example 12 includes the non-transitory computer readable storage medium of example 9, wherein the bit descriptor is a first bit descriptor, further including instructions which, when executed, cause the machine to at least calculate an absolute difference between a first pixel intensity value of the first pixel and a second pixel intensity value of the second pixel, calculate a hamming distance between the first bit descriptor of the first pixel and a second bit descriptor of the second pixel, calculate a sum of the absolute difference and the hamming distance, and determine the disparity by clamping the sum to an integer.

Example 13 includes the non-transitory computer readable storage medium of example 8, wherein the matching cost is a first matching cost, further including instructions which, when executed, cause the machine to at least rearrange matching costs including the first matching cost using barrel shifters.

Example 14 includes the non-transitory computer readable storage medium of example 1, further including instructions which, when executed, cause the machine to at least calculate a first aggregated cost associated with a first propagation path corresponding to a left-to-right input path from the second pixel to the first pixel, calculate a second aggregated cost associated with a second propagation path corresponding to a right-to-left input path from the second pixel to the first pixel, calculate a third aggregated cost associated with a third propagation path corresponding to a top-to-bottom input path from the second pixel to the first pixel, and determine the disparity map based on calculating a sum of the first aggregated cost, the second aggregated cost, and the third aggregated cost.

Example 15 includes a method to perform stereo matching, the method comprising determining a value associated with a first location of a first pixel of a first image and a second location of a second pixel of a second image by calculating a matching cost between the first location and the second location, generating a disparity map including the value, and determining a minimum value based on the disparity map corresponding to a difference in horizontal coordinates between the first location and the second location.

Example 16 includes the method of example 15, further including generating a bit descriptor that maps intensity values of a set of pixels of a pixel kernel including the second pixel to a bit string.

Example 17 includes the method of example 16, wherein generating the bit string includes comparing the intensity values of the set of pixels to an intensity value of a central pixel of the pixel kernel, an average value of the intensity values, or a threshold value.

Example 18 includes the method of example 16, wherein the bit descriptor is a post-mask bit descriptor, and generating the bit string by applying a concatenation mask and one or more sorting trees to a pre-mask bit descriptor to generate the post-mask bit descriptor.

Example 19 includes the method of example 16, wherein the bit descriptor is a first bit descriptor, and determining the disparity by calculating an absolute difference between a first pixel intensity value of the first pixel and a second pixel intensity value of the second pixel, calculating a hamming distance between the first bit descriptor of the first pixel and a second bit descriptor of the second pixel, calculating a sum of the absolute difference and the hamming distance, and determining the disparity by clamping the sum to an integer.

Example 20 includes the method of example 15, wherein the matching cost is a first matching cost, further including rearranging matching costs including the first matching cost using barrel shifters.

Example 21 includes the method of example 15, further including calculating a first aggregated cost associated with a first propagation path corresponding to a left-to-right input path from the second pixel to the first pixel, calculate a second aggregated cost associated with a second propagation path corresponding to a right-to-left input path from the second pixel to the first pixel, calculate a third aggregated cost associated with a third propagation path corresponding to a top-to-bottom input path from the second pixel to the first pixel, and determine the disparity map based on calculating a sum of the first aggregated cost, the second aggregated cost, and the third aggregated cost.

Example 22 includes an apparatus to perform stereo matching, the apparatus comprising a first means to determine a value associated with a first location of a first pixel of a first image and a second location of a second pixel of a second image by calculating a matching cost between the first location and the second location, and a second means to generate a disparity map including the value, and determine a minimum value based on the disparity map corresponding to a difference in horizontal coordinates between the first location and the second location.

Example 23 includes the apparatus of example 22, further including a third means to generate a bit descriptor that maps intensity values of a set of pixels of a pixel kernel including the second pixel to a bit string.

Example 24 includes the apparatus of example 23, wherein the third means is to generate the bit string by comparing the intensity values of the set of pixels to an intensity value of a central pixel of the pixel kernel, an average value of the intensity values, or a threshold value.

Example 25 includes the apparatus of example 23, wherein the bit descriptor is a post-mask bit descriptor, the third means to generate the bit string by applying a concatenation mask and one or more sorting trees to a pre-mask bit descriptor to generate the post-mask bit descriptor.

Example 26 includes the apparatus of example 23, wherein the bit descriptor is a first bit descriptor, the first means to determine the disparity by calculating an absolute difference between a first pixel intensity value of the first pixel and a second pixel intensity value of the second pixel, calculating a hamming distance between the first bit descriptor of the first pixel and a second bit descriptor of the second pixel, calculating a sum of the absolute difference and the hamming distance, and determining the disparity by clamping the sum to an integer.

Example 27 includes the apparatus of example 22, wherein the matching cost is a first matching cost, the first means to rearrange matching costs including the first matching cost using barrel shifters.

Example 28 includes the apparatus of example 22, wherein the second means is to calculate a first aggregated cost associated with a first propagation path corresponding to a left-to-right input path from the second pixel to the first pixel, calculate a second aggregated cost associated with a second propagation path corresponding to a right-to-left input path from the second pixel to the first pixel, calculate a third aggregated cost associated with a third propagation path corresponding to a top-to-bottom input path from the second pixel to the first pixel, and determine the disparity map based on calculating a sum of the first aggregated cost, the second aggregated cost, and the third aggregated cost.

Examples disclosed herein may apply to internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements.

Backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices, such as over the backbone links, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

Clusters of IoT devices may be equipped to communicate with other IoT devices as well as with a cloud network. This may allow the IoT devices to form an ad-hoc network between the devices, allowing them to function as a single device, which may be termed a fog device.

A cloud computing network in communication with a mesh network of IoT devices may operate as a fog device at the edge of the cloud computing network. The mesh network of IoT devices may be termed a fog, operating at the edge of the cloud.

The fog may be considered to be a massively interconnected network wherein a number of IoT devices are in communications with each other, for example, by radio links. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices include gateways, data aggregators, and sensors, although any combinations of IoT devices and functionality may be used. The gateways may be edge devices that provide communications between the cloud and the fog, and may also provide the backend process function for data obtained from sensors, such as motion data, flow data, temperature data, and the like. The data aggregators may collect data from any number of the sensors, and perform the back end processing function for the analysis. The results, raw data, or both may be passed along to the cloud through the gateways. The sensors may be full IoT devices, for example, capable of both collecting data and processing the data. In some cases, the sensors may be more limited in functionality, for example, collecting the data and allowing the data aggregators or gateways to process the data.

Communications from any IoT device may be passed along a convenient path (e.g., a most convenient path) between any of the IoT devices to reach the gateways. In these networks, the number of interconnections provide substantial redundancy, allowing communications to be maintained, even with the loss of a number of IoT devices. Further, the use of a mesh network may allow IoT devices that are very low power or located at a distance from infrastructure to be used, as the range to connect to another IoT device may be much less than the range to connect to the gateways.

The fog provided from these IoT devices may be presented to devices in the cloud, such as a server, as a single device located at the edge of the cloud, e.g., a fog device. In this example, the alerts coming from the fog device may be sent without being identified as coming from a specific IoT device within the fog. In this fashion, the fog may be considered a distributed platform that provides computing and storage resources to perform processing or data-intensive tasks such as data analytics, data aggregation, and machine-learning, among others.

In some examples, the IoT devices may be configured using an imperative programming style, e.g., with each IoT device having a specific function and communication partners. However, the IoT devices forming the fog device may be configured in a declarative programming style, allowing the IoT devices to reconfigure their operations and communications, such as to determine needed resources in response to conditions, queries, and device failures. As an example, a query from a user located at a server about the operations of a subset of equipment monitored by the IoT devices may result in the fog device selecting the IoT devices, such as particular sensors, needed to answer the query. The data from these sensors may then be aggregated and analyzed by any combination of the sensors, data aggregators, or gateways, before being sent on by the fog device to the server to answer the query. In this example, IoT devices in the fog may select the sensors used based on the query, such as adding data from flow sensors or temperature sensors. Further, if some of the IoT devices are not operational, other IoT devices in the fog device may provide analogous data, if available.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A hardware pipeline to perform stereo matching, the hardware pipeline comprising:
   a first logic circuit to:
      determine disparity values associated with differences in locations of pixels included in different images, the disparity values including a first disparity value associated with a first difference value corresponding to (A) a first location of a first pixel of a first image and (B) a second location of a second pixel of a second image, the first disparity value based on a comparison of a first intensity of the first pixel and a second intensity of the second pixel; and rearrange ones of the disparity values using barrel shifters;
a second logic circuit in circuit with the first logic circuit, the second logic circuit to:
  generate a disparity map representative of the differences in the locations of the pixels, the disparity map including the first disparity value; and
  cause a stereo image to be generated based on a determination that the first pixel corresponds to the second pixel, the determination based on the disparity map.

2. The hardware pipeline of claim 1, further including a third logic circuit in circuit with the first logic circuit and the second logic circuit, the third logic circuit to generate a bit descriptor, the bit descriptor to map intensity values of a set of pixels of a pixel kernel to a bit string, the set of the pixels including the first pixel.

3. The hardware pipeline of claim 2, wherein the third logic circuit is to generate the bit string based on a comparison of the intensity values of the set of the pixels to at least one of a first intensity value of a central pixel of the pixel kernel, an average value of the intensity values of the set of the pixels, or a threshold value.

4. The hardware pipeline of claim 2, wherein the bit descriptor is a post-mask bit descriptor having a first number of bits, the third logic circuit to generate the post-mask bit descriptor based on an application of a concatenation mask to a pre-mask bit descriptor, the concatenation mask to have a second number of bits and one or more sorting trees, the pre-mask bit descriptor to have a third number of bits, and the first number, the second number, and the third number of bits being different from each other.

5. The hardware pipeline of claim 2, wherein the bit descriptor is a first bit descriptor, and the first logic circuit is to:
  calculate an absolute difference between the first intensity and the second intensity;
  calculate a Hamming distance between the first bit descriptor of the first pixel and a second bit descriptor of the second pixel;
  calculate a sum of the absolute difference and the Hamming distance; and
  clamp the sum to an integer, the first disparity value based on the integer.

6. The hardware pipeline of claim 1, wherein the second logic circuit is to:
  calculate a first aggregated cost associated with a first propagation path, the first propagation path corresponding to a left-to-right input path from the second pixel to the first pixel;
  calculate a second aggregated cost associated with a second propagation path, the second propagation path corresponding to a right-to-left input path from the second pixel to the first pixel;
  calculate a third aggregated cost associated with a third propagation path, the third propagation path corresponding to a top-to-bottom input path from the second pixel to the first pixel; and
  determine the disparity map based on a sum of the first aggregated cost, the second aggregated cost, and the third aggregated cost.

7. A non-transitory computer readable storage medium comprising instructions which, when executed, cause a hardware pipeline to at least:
  generate, with a first logic circuit, a bit descriptor based on a comparison of intensity values of first pixels of a pixel kernel of a first image to at least one of (i) a first intensity value of a central pixel of the pixel kernel, (ii) an average value of the intensity values, or (iii) a threshold value, the bit descriptor to associate the intensity values with a bit string;
  determine, with a second logic circuit in circuit with the first logic circuit, disparity values associated with differences in locations of first ones of the first pixels and second pixels of a second image, the disparity values including a first disparity value associated with a first difference value corresponding to (A) a first location of a third pixel of the first pixels and (B) a second location of a fourth pixel of the second pixels, the first disparity value based on a comparison of a first intensity of the third pixel and a second intensity of the fourth pixel;
  generate, with a third logic circuit in circuit with at least one of the first logic circuit or the second logic circuit, a disparity map based on the differences in the locations of the first ones of the first pixels and the second pixels, the disparity map including the first disparity value; and
  output, with a fourth logic circuit in circuit with at least one of the first logic circuit, the second logic circuit, or the third logic circuit, a stereo image based on a determination that the third pixel corresponds to the fourth pixel, the determination based on the disparity map.

8. The non-transitory computer readable storage medium of claim 7, wherein the bit descriptor is a post-mask bit descriptor with a first number of bits, the instructions, when executed, cause the hardware pipeline to generate, with the first logic circuit, the post-mask bit descriptor based on an application of a concatenation mask to a pre-mask bit descriptor, the concatenation mask to have a second number of bits and one or more sorting trees, the pre-mask bit descriptor to have a third number of bits, and the first number, the second number, and the third number of bits to be different from each other.

9. The non-transitory computer readable storage medium of claim 7, wherein the bit descriptor is a first bit descriptor, and the instructions, when executed, cause the hardware pipeline to:
  calculate an absolute difference between the first intensity and the second intensity;
  calculate a Hamming distance between the first bit descriptor of the third pixel and a second bit descriptor of the fourth pixel;
  calculate a sum of the absolute difference and the Hamming distance; and
  clamp the sum to an integer.

10. The non-transitory computer readable storage medium of claim 7, wherein the instructions, when executed, cause the hardware pipeline to rearrange the disparity values using barrel shifters.

11. The non-transitory computer readable storage medium of claim 7, wherein the instructions, when executed, cause the hardware pipeline to:
  calculate a first aggregated cost associated with a first propagation path, the first propagation path corresponding to a left-to-right input path from the fourth pixel to the third pixel;
  calculate a second aggregated cost associated with a second propagation path, the second propagation path corresponding to a right-to-left input path from the fourth pixel to the third pixel;
  calculate a third aggregated cost associated with a third propagation path, the third propagation path corresponding to a top-to-bottom input path from the fourth pixel to the third pixel; and determine the disparity map based on a sum of the first aggregated cost, the second aggregated cost, and the third aggregated cost.

12. A hardware pipeline to perform stereo matching, the hardware pipeline comprising:
   means for generating a post-mask bit descriptor based on an application of a concatenation mask to a pre-mask bit descriptor, the post-mask bit descriptor to map intensity values of first pixels of a pixel kernel of a first image to a bit string, the post-mask bit descriptor to have a first number of bits, the concatenation mask to have at least one of a second number of bits or one or more sorting trees, the pre-mask bit descriptor to have a third number of bits, and the first number, the second number, and the third number of bits to be different from each other;
   means for determining in circuit with the means for generating, the means for determining to determine disparity values associated with differences in locations of ones of the first pixels and second pixels of a second image, the disparity values including a first disparity value associated with a first difference value corresponding to (A) a first location of a third pixel of the first pixels and a second location of a fourth pixel of the second pixels, the first disparity value based on a comparison of a first intensity of the third pixel and a second intensity of the fourth pixel; and
   means for aggregating in circuit with the means for determining, the means for aggregating to:
      generate a disparity map representative of the differences in the locations of the pixels, the disparity map including the first disparity value; and
      cause a stereo image to be generated in response to a determination that the third pixel corresponds to the fourth pixel, the determination based on the disparity map.

13. The hardware pipeline of claim 12, wherein the means for generating is to generate the bit string based on a comparison of the intensity values of the first pixels to at least one of a first intensity value of a central pixel of the pixel kernel, an average value of the intensity values of the first pixels, or a threshold value.

14. The hardware pipeline of claim 12, wherein the post-mask bit descriptor is a first post-mask bit descriptor, the means for determining is to:
   determine an absolute difference between the first intensity and the second intensity;
   determine a Hamming distance between the first post-mask bit descriptor of the third pixel and a second post-mask bit descriptor of the fourth pixel;
   determine a sum of the absolute difference and the Hamming distance; and
   clamp the sum to an integer.

15. The hardware pipeline of claim 12, wherein the means for determining is to rearrange the disparity values using barrel shifters.

16. The hardware pipeline of claim 12, wherein the means for aggregating is to:
   calculate a first aggregated cost associated with a first propagation path, the first propagation path corresponding to a left-to-right input path from the fourth pixel to the third pixel;
   calculate a second aggregated cost associated with a second propagation path, the second propagation path corresponding to a right-to-left input path from the fourth pixel to the third pixel;
   calculate a third aggregated cost associated with a third propagation path, the third propagation path corresponding to a top-to-bottom input path from the fourth pixel to the third pixel; and
   determine the disparity map based on a sum of the first aggregated cost, the second aggregated cost, and the third aggregated cost.

17. A method to perform stereo matching, the method comprising:
   determining disparity values associated with differences in locations of pixels included in different images, the disparity values including a first disparity value associated with a first difference value corresponding to (A) a first location of a first pixel of a first image and (B) a second location of a second pixel of a second image, the first disparity value based on a comparison of a first intensity of the first pixel and a second intensity of the second pixel, the determining of the first disparity value including:
      determining an absolute difference between the first intensity and the second intensity;
      determining a Hamming distance between a first bit descriptor of the first pixel and a second bit descriptor of the second pixel;
      determining a sum of the absolute difference and the Hamming distance; and
      clamping the sum to an integer;
   generating a disparity map representative of the differences in the locations of the pixels, the disparity map including the first disparity value; and
   in response to determining that the first pixel corresponds to the second pixel based on the disparity map, generating a stereo image based on the first pixel and the second pixel.

18. The method of claim 17, further including generating the first bit descriptor to map a first intensity value of the first intensity to a bit string.

19. The method of claim 17, further including generating the first bit descriptor by comparing the first intensity of the first pixel to at least one of a first intensity value of a central pixel of a pixel kernel including the first pixel, an average value of third intensity values of the pixel kernel, or a threshold value.

20. The method of claim 17, wherein the first bit descriptor is a post-mask bit descriptor with a first number of bits, and further including generating the post-mask bit descriptor by applying a concatenation mask to a pre-mask bit descriptor, the concatenation mask to have a second number of bits and one or more sorting trees, the pre-mask bit descriptor to have a third number of bits, and the first number, the second number, and the third number of bits being different from each other.

21. The method of claim 17, further including rearranging ones of the disparity values using at least one barrel shifter.

22. The method of claim 17, further including:
   generating a first aggregated cost associated with a first propagation path, the first propagation path corresponding to a left-to-right input path from the second pixel to the first pixel;
   generating a second aggregated cost associated with a second propagation path, the second propagation path corresponding to a right-to-left input path from the second pixel to the first pixel;
   generating a third aggregated cost associated with a third propagation path, the third propagation path corresponding to a top-to-bottom input path from the second pixel to the first pixel; and determining the disparity map based on a sum of the first aggregated cost, the second aggregated cost, and the third aggregated cost.

23. An apparatus to perform stereo matching, the apparatus comprising:
at least one memory;
machine readable instructions; and
processor circuitry to execute the machine readable instructions to:
  generate a bit descriptor based on a comparison of intensity values of first pixels of a pixel kernel of a first image to at least one of (i) a first intensity value of a central pixel of the pixel kernel, (ii) an average value of the intensity values, or (iii) a threshold value;
  determine disparity values associated with differences in locations of first ones of the first pixels and second pixels of a second image, the disparity values including a first disparity value associated with a first difference value corresponding to (A) a first location of a third pixel of the first pixels and (B) a second location of a fourth pixel of the second pixels, the first disparity value based on a comparison of a first intensity of the third pixel and a second intensity of the fourth pixel;
  generate a disparity map based on the differences in the locations of the first ones of the first pixels and the second pixels, the disparity map including the first disparity value; and
  output a stereo image based on a determination that the third pixel corresponds to the fourth pixel, the determination to be based on the disparity map.

24. The apparatus of claim 23, wherein the bit descriptor is a post-mask bit descriptor with a first number of bits, the processor circuitry is to generate the post-mask bit descriptor based on an application of a concatenation mask to a pre-mask bit descriptor, the concatenation mask to have a second number of bits and one or more sorting trees, the pre-mask bit descriptor to have a third number of bits, and the first number, the second number, and the third number of bits to be different from each other.

25. The apparatus of claim 23, wherein the bit descriptor is a first bit descriptor, and the processor circuitry is to:
  determine an absolute difference between the first intensity and the second intensity;
  determine a Hamming distance between the first bit descriptor of the third pixel and a second bit descriptor of the fourth pixel;
  determine a sum of the absolute difference and the Hamming distance; and
  reduce the sum to an integer.

26. The apparatus of claim 23, wherein the processor circuitry is to rearrange ones of the disparity values using one or more barrel shifters.

27. The apparatus of claim 23, wherein the processor circuitry is to:
  output a first aggregated cost associated with a first propagation path, the first propagation path corresponding to a left-to-right input path from the fourth pixel to the third pixel;
  output a second aggregated cost associated with a second propagation path, the second propagation path corresponding to a right-to-left input path from the fourth pixel to the third pixel;
  output a third aggregated cost associated with a third propagation path, the third propagation path corresponding to a top-to-bottom input path from the fourth pixel to the third pixel; and
  determine the disparity map based on a sum of the first aggregated cost, the second aggregated cost, and the third aggregated cost.

* * * * *